US010445059B2

(12) United States Patent
Miyazawa

(10) Patent No.: US 10,445,059 B2
(45) Date of Patent: Oct. 15, 2019

(54) INFORMATION PROCESSING DEVICE, INFORMATION PROCESSING METHOD, AND PROGRAM FOR GENERATING A NOTIFICATION SOUND

(71) Applicant: Sony Corporation, Tokyo (JP)

(72) Inventor: Yusuke Miyazawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 637 days.

(21) Appl. No.: 14/357,225

(22) PCT Filed: Jan. 23, 2013

(86) PCT No.: PCT/JP2013/000312
§ 371 (c)(1),
(2) Date: May 9, 2014

(87) PCT Pub. No.: WO2013/114821
PCT Pub. Date: Aug. 8, 2013

(65) Prior Publication Data
US 2014/0304604 A1 Oct. 9, 2014

(30) Foreign Application Priority Data

Feb. 3, 2012 (JP) ................................. 2012-021887

(51) Int. Cl.
*G06F 3/16* (2006.01)
*G06F 3/0485* (2013.01)
*G06F 3/0481* (2013.01)

(52) U.S. Cl.
CPC ............ *G06F 3/167* (2013.01); *G06F 3/0481* (2013.01); *G06F 3/0485* (2013.01)

(58) Field of Classification Search
CPC ....................................................... G06F 3/167
See application file for complete search history.

(56) References Cited

U.S. PATENT DOCUMENTS 5,798,922 A * 8/1998 Wood ...................... H04S 1/007
369/87
5,946,386 A * 8/1999 Rogers .................... H04L 29/06
379/265.09

(Continued)

FOREIGN PATENT DOCUMENTS

EP       2251856 A2    11/2010
JP     2005-326987    11/2005

(Continued)

OTHER PUBLICATIONS

Google, "Android 2.2 User's Guide", May 20, 2010, Google, Inc., AUG-2.2.0-100, pp. 1, 2, 19-28.*

(Continued)

*Primary Examiner* — Nicholas Klicos
(74) *Attorney, Agent, or Firm* — Paratus Law Group, PLLC

(57) ABSTRACT

Provided is an information processing device including a display control unit configured to initiate a selective displaying of content screens, and a sound output control unit configured to generate localization information of a notification sound associated with a first content screen that is not currently being displayed and initiate an outputting of the notification sound to a user in accordance with the localization information while a second content screen is being displayed.

31 Claims, 15 Drawing Sheets

(56) References Cited

U.S. PATENT DOCUMENTS

| | | | | |
|---|---|---|---|---|
| 6,330,486 | B1* | 12/2001 | Padula | G06F 3/011 |
| | | | | 381/306 |
| 7,552,396 | B1* | 6/2009 | Bicheno | G06F 11/324 |
| | | | | 715/736 |
| 7,620,905 | B2* | 11/2009 | Boss | G06F 3/0481 |
| | | | | 715/766 |
| 8,893,038 | B2* | 11/2014 | Bennah | G06F 3/0481 |
| | | | | 715/711 |
| 9,037,455 | B1* | 5/2015 | Faaborg | G10L 21/00 |
| | | | | 704/208 |
| 2002/0104323 | A1* | 8/2002 | Rash | F24F 11/30 |
| | | | | 62/176.1 |
| 2002/0175933 | A1* | 11/2002 | Ronkainen | G06F 3/0481 |
| | | | | 715/727 |
| 2003/0160815 | A1* | 8/2003 | Muschetto | G06F 3/0481 |
| | | | | 715/733 |
| 2005/0047624 | A1* | 3/2005 | Kleen | G06F 3/165 |
| | | | | 381/388 |
| 2006/0069747 | A1 | 3/2006 | Matsushita | |
| 2006/0236255 | A1 | 10/2006 | Lindsay et al. | |
| 2007/0180379 | A1* | 8/2007 | Osato | G06F 3/04855 |
| | | | | 715/703 |
| 2008/0025529 | A1* | 1/2008 | Keohane | G06F 3/165 |
| | | | | 381/104 |
| 2008/0313540 | A1* | 12/2008 | Dirks | G06F 3/04815 |
| | | | | 715/710 |
| 2009/0058845 | A1* | 3/2009 | Fukuda | B60K 35/00 |
| | | | | 345/214 |
| 2009/0249247 | A1* | 10/2009 | Tseng | H04M 1/72552 |
| | | | | 715/808 |
| 2010/0119092 | A1* | 5/2010 | Kim | H04R 3/12 |
| | | | | 381/306 |
| 2011/0055703 | A1* | 3/2011 | Lundback | H04R 27/00 |
| | | | | 715/727 |
| 2011/0113337 | A1* | 5/2011 | Liu | G06F 3/0483 |
| | | | | 715/727 |
| 2011/0231192 | A1* | 9/2011 | O'Conor | G06F 17/30899 |
| | | | | 704/260 |
| 2011/0316768 | A1* | 12/2011 | McRae | G06F 3/165 |
| | | | | 345/156 |
| 2012/0051567 | A1* | 3/2012 | Castor-Perry | H04R 29/002 |
| | | | | 381/304 |
| 2012/0316876 | A1* | 12/2012 | Jang | G06F 3/167 |
| | | | | 704/246 |
| 2014/0068434 | A1* | 3/2014 | Filev | G06F 3/0484 |
| | | | | 715/716 |
| 2014/0120988 | A1* | 5/2014 | Gunn | G06F 3/0488 |
| | | | | 455/566 |
| 2014/0136986 | A1* | 5/2014 | Martin | G06F 3/0488 |
| | | | | 715/748 |
| 2014/0379341 | A1* | 12/2014 | Seo | G10L 15/22 |
| | | | | 704/246 |

FOREIGN PATENT DOCUMENTS

| | | |
|---|---|---|
| JP | 2005-327054 | 11/2005 |
| JP | 2008-021186 | 1/2008 |
| JP | 2008-151766 | 7/2008 |

OTHER PUBLICATIONS

Jul. 6, 2016, CN communication issued for related CN application No. 201380006749.0.

May 10, 2016, Japanese Office Action for related JP Application No. 2012-021887.

Jul. 19, 2017, EP communication issued for related EP application No. 13707452.2.

May 9, 2018, Chinese Office Action issued for related CN Application No. 201380006749.0.

* cited by examiner

[Fig. 1]
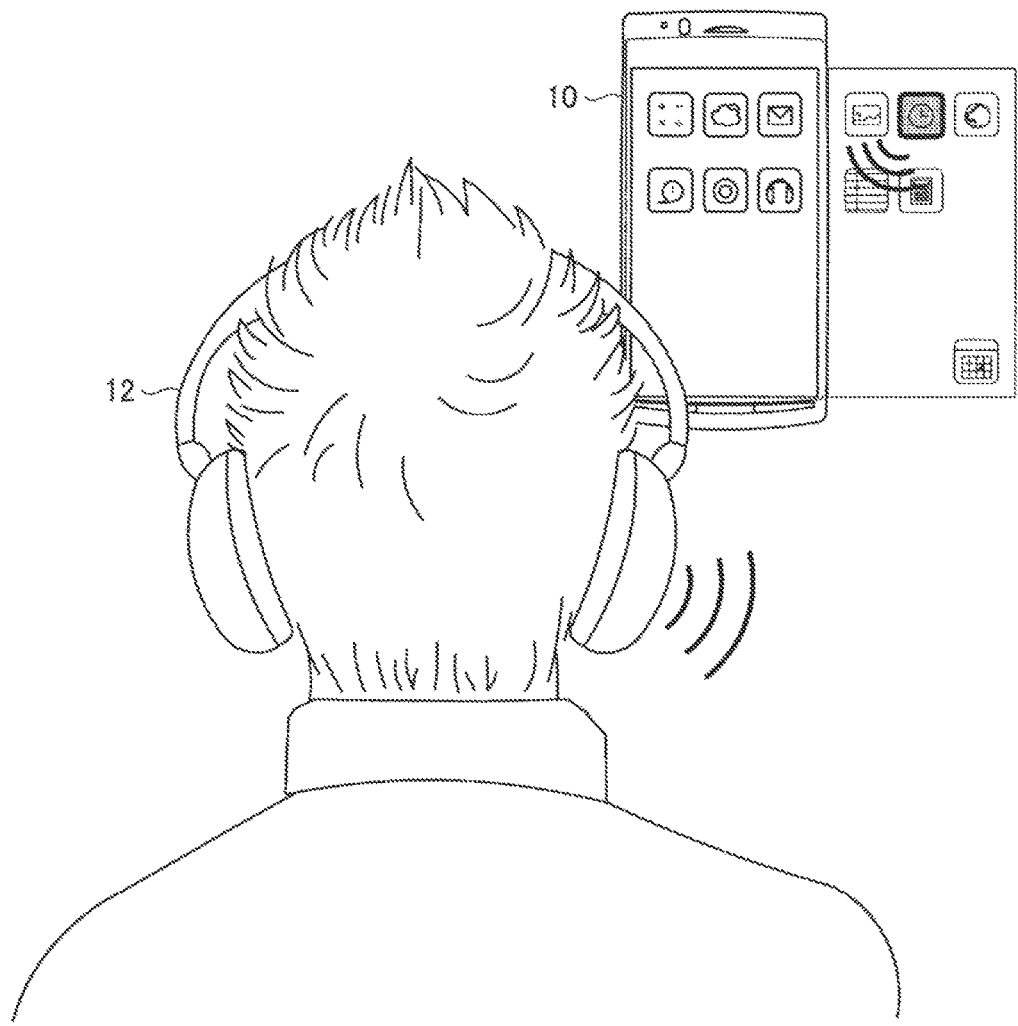

[Fig. 2]
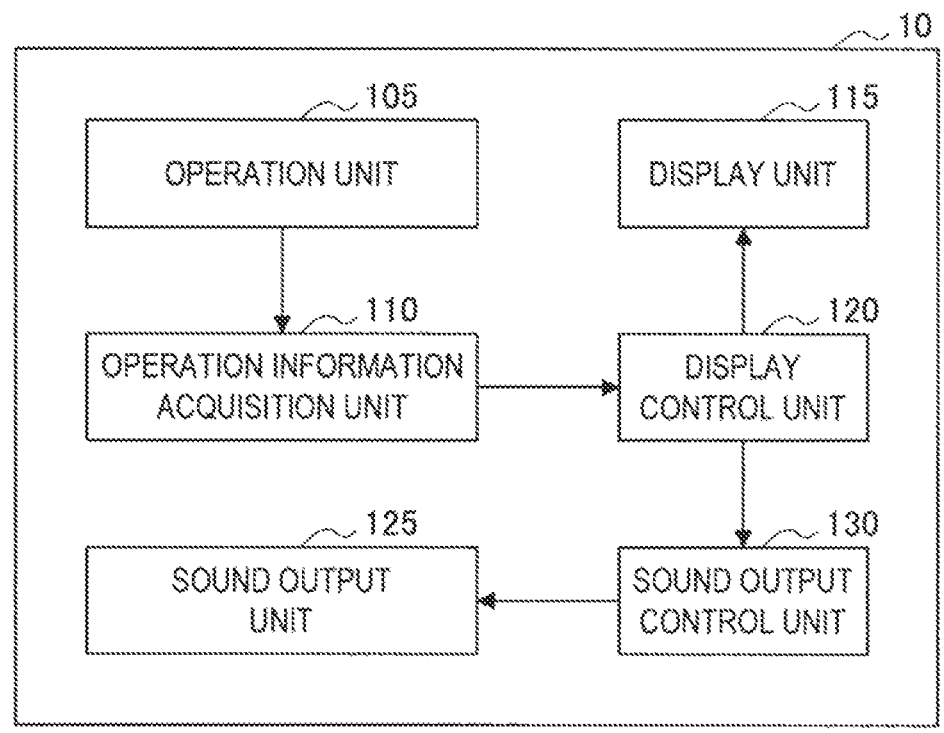

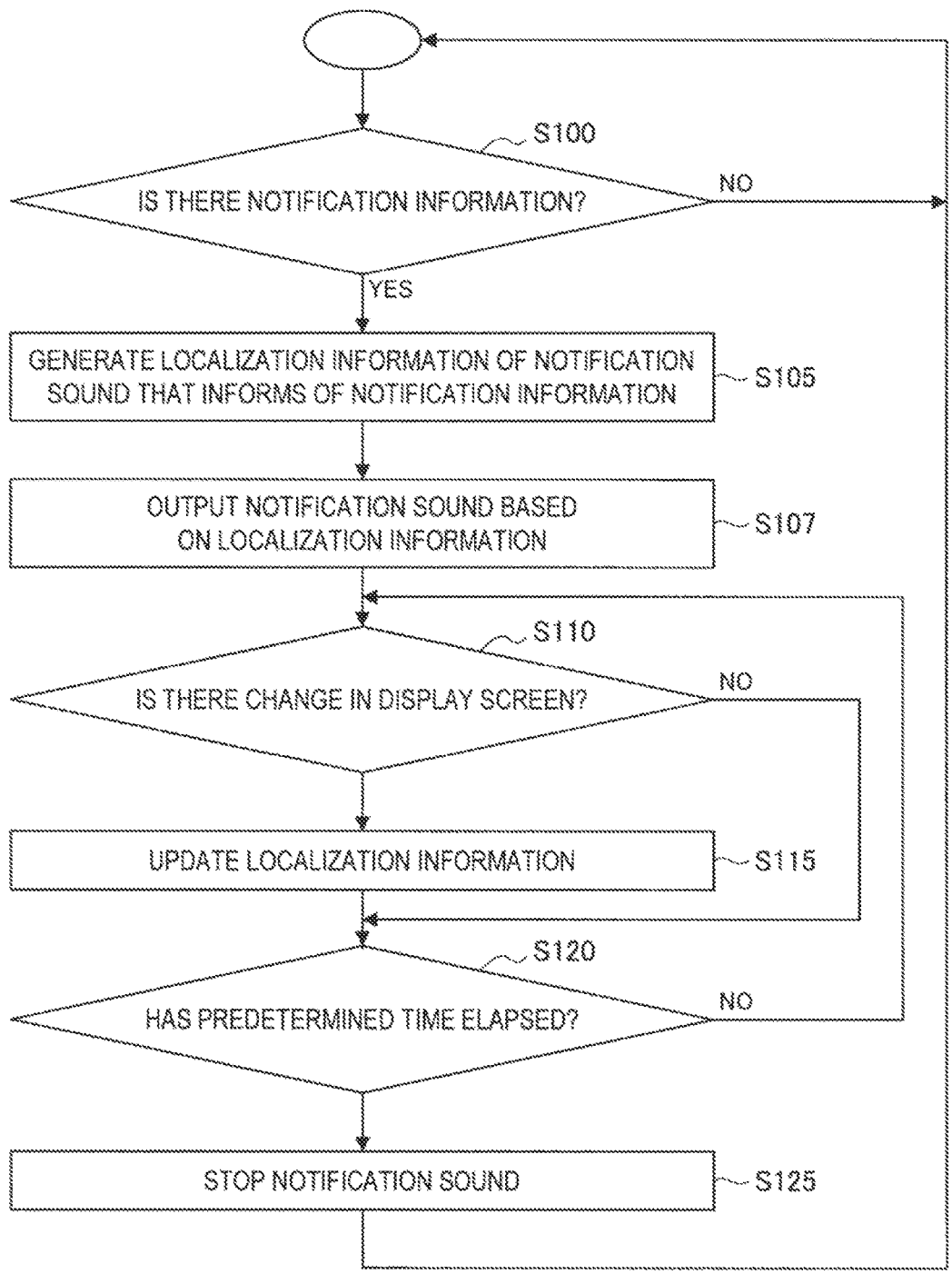
[Fig. 3]

[Fig. 4]
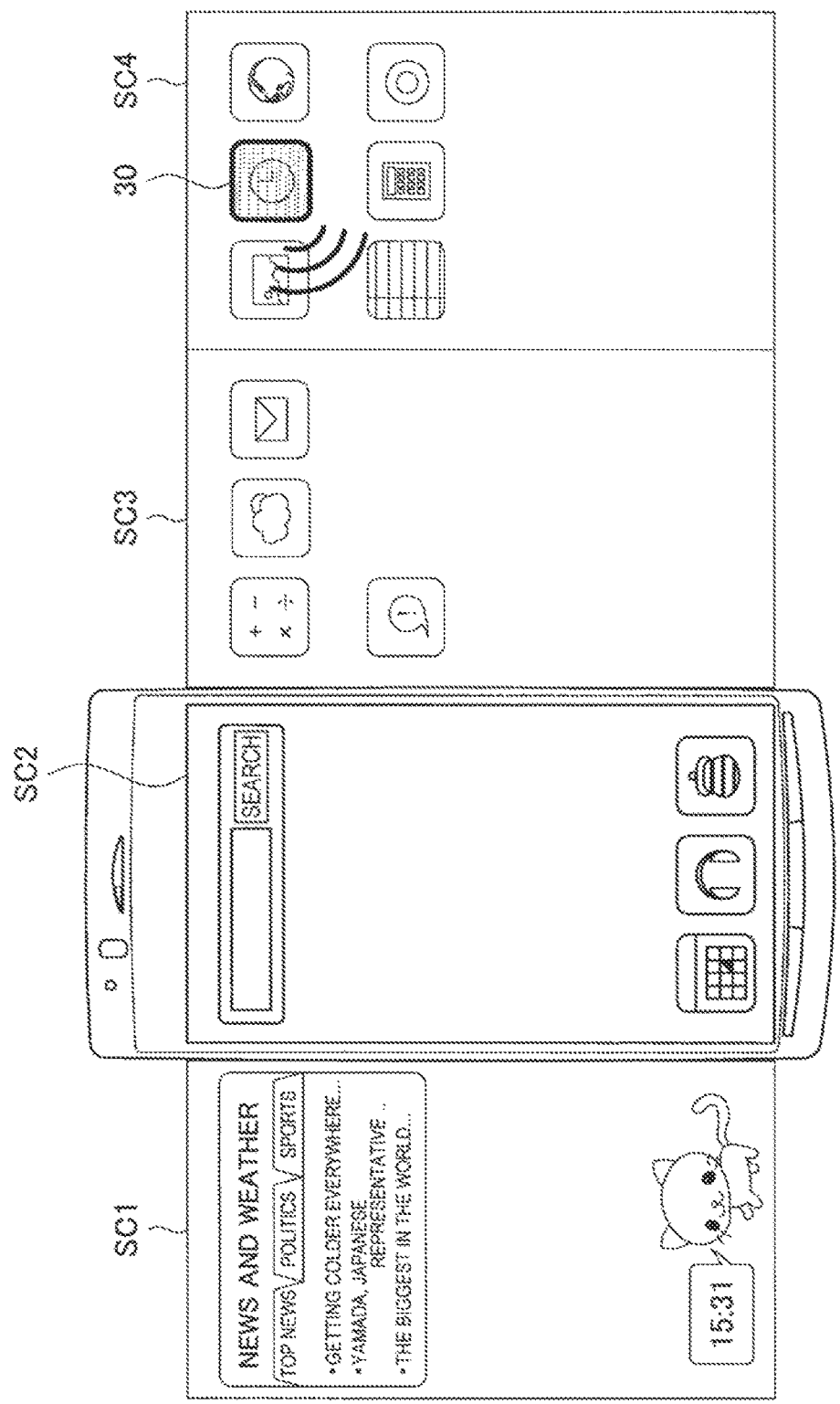

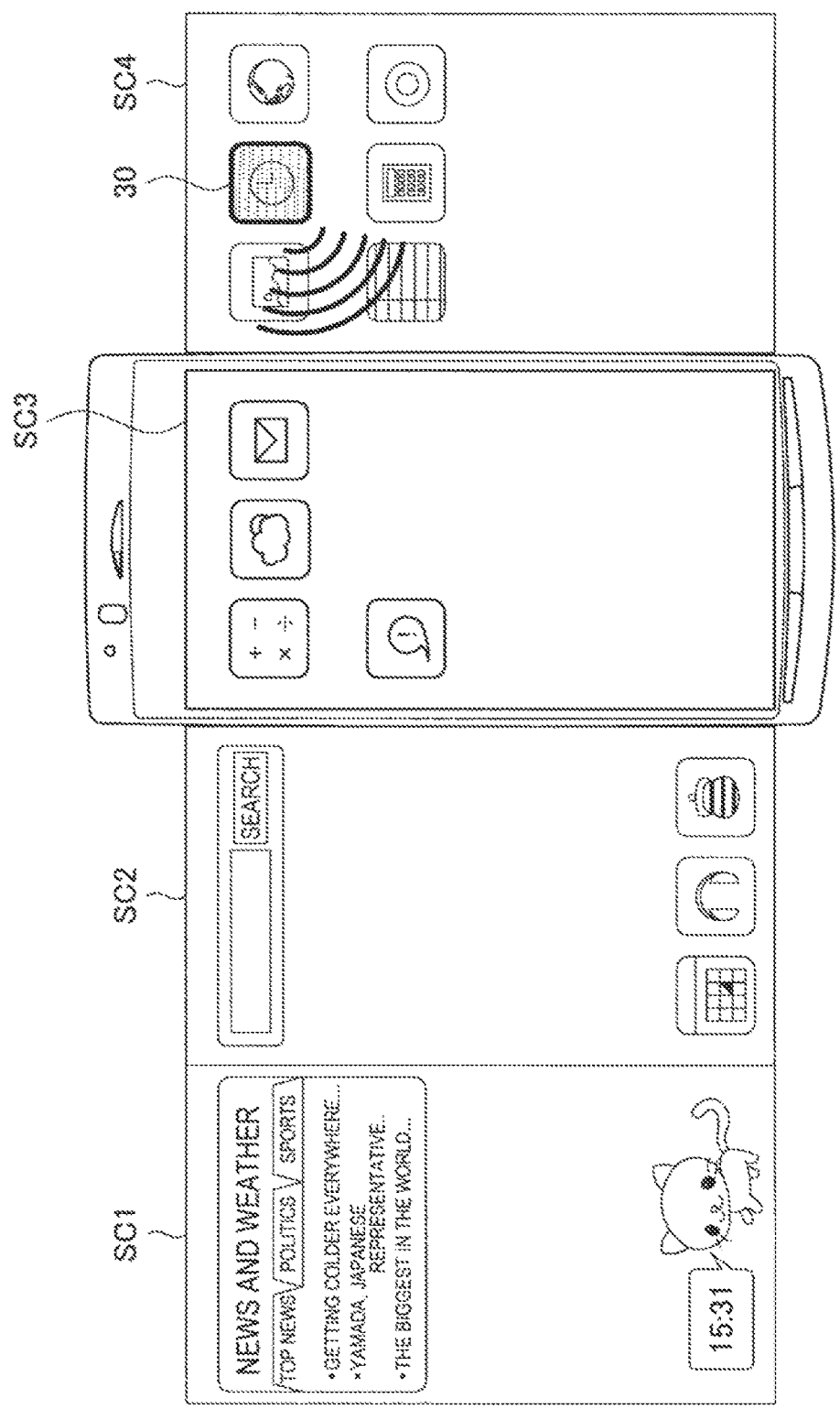

[Fig. 6]
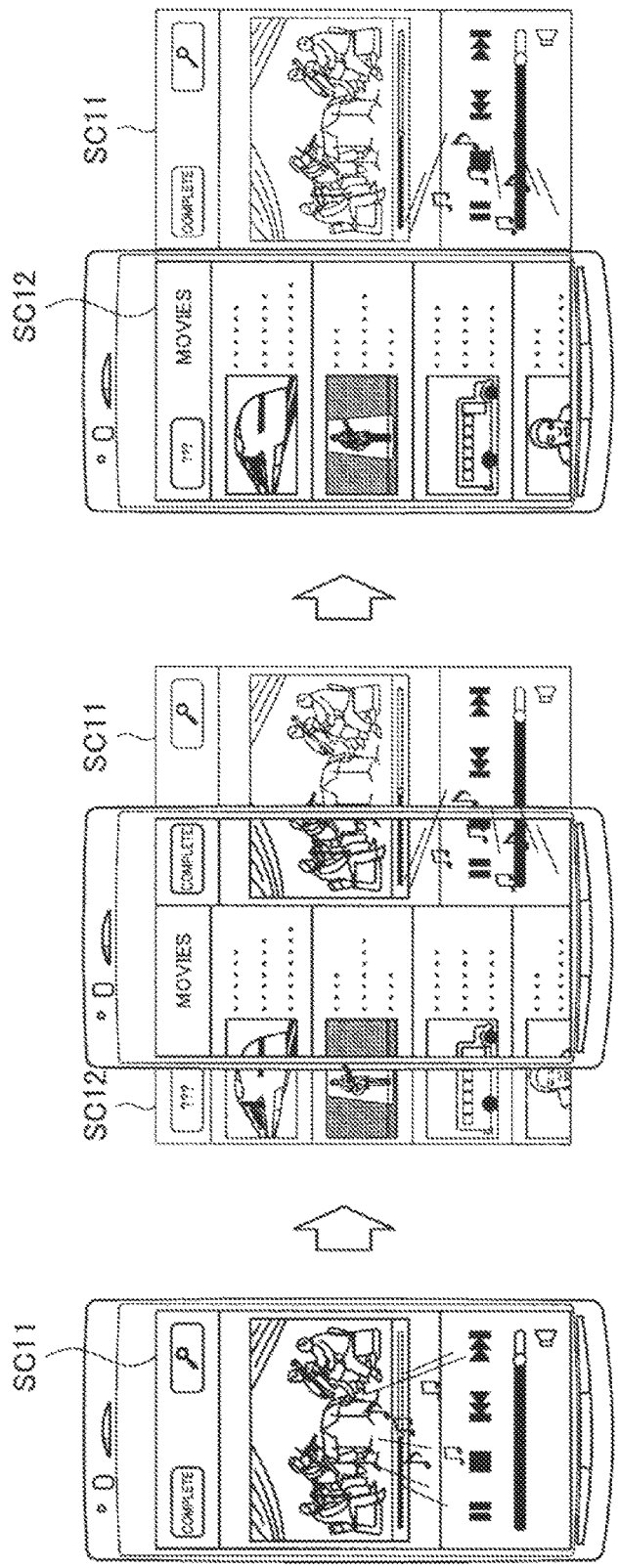

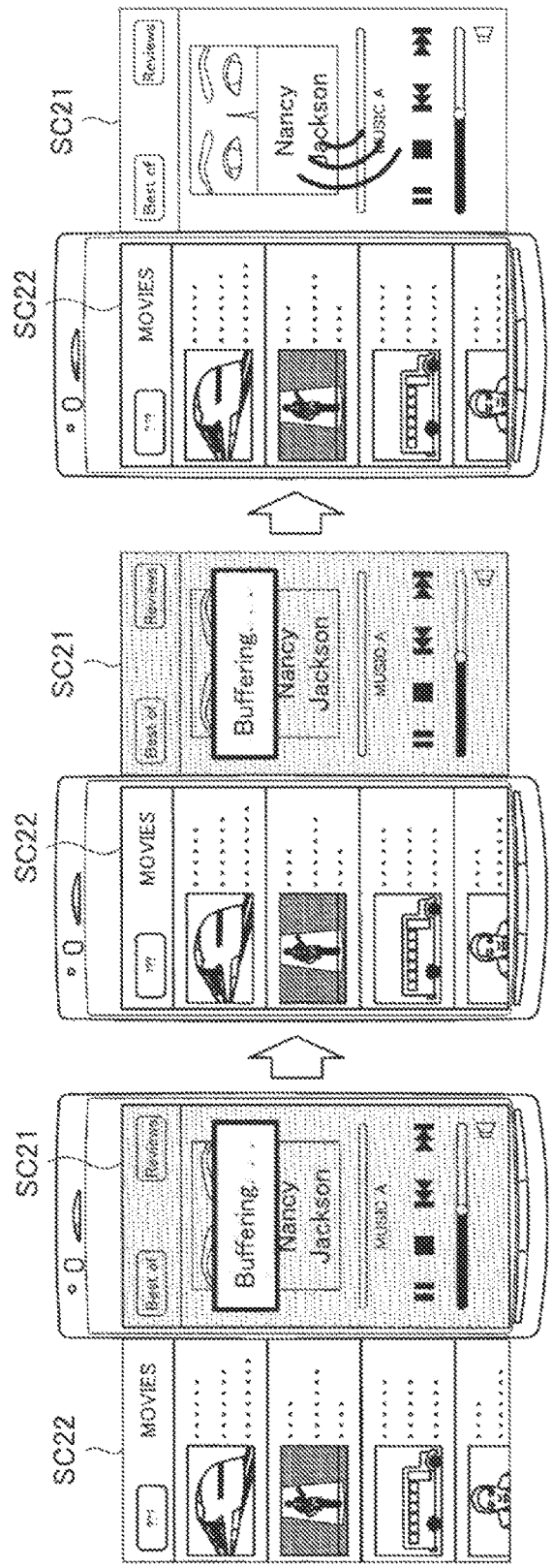
[Fig. 7]

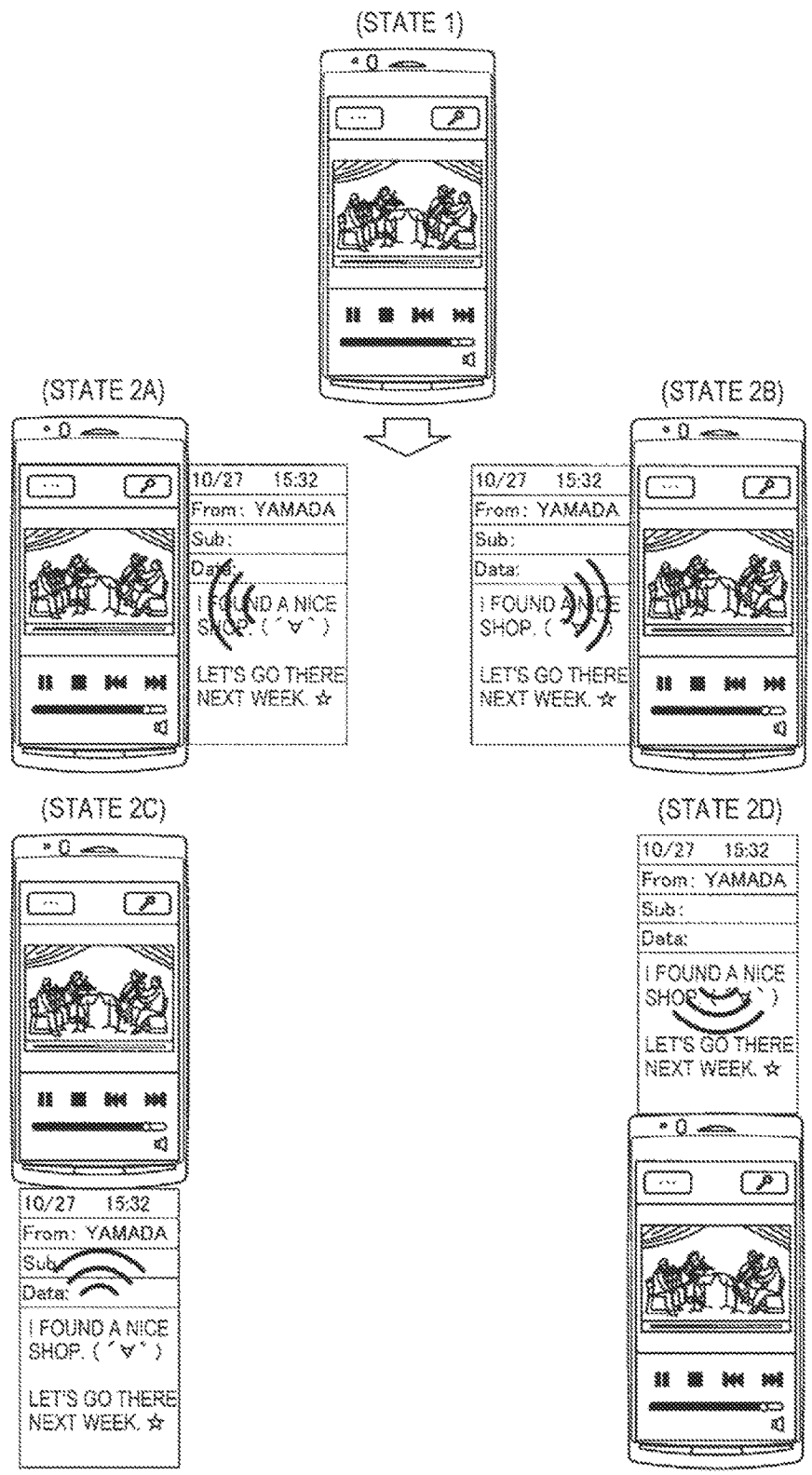
[Fig. 8]

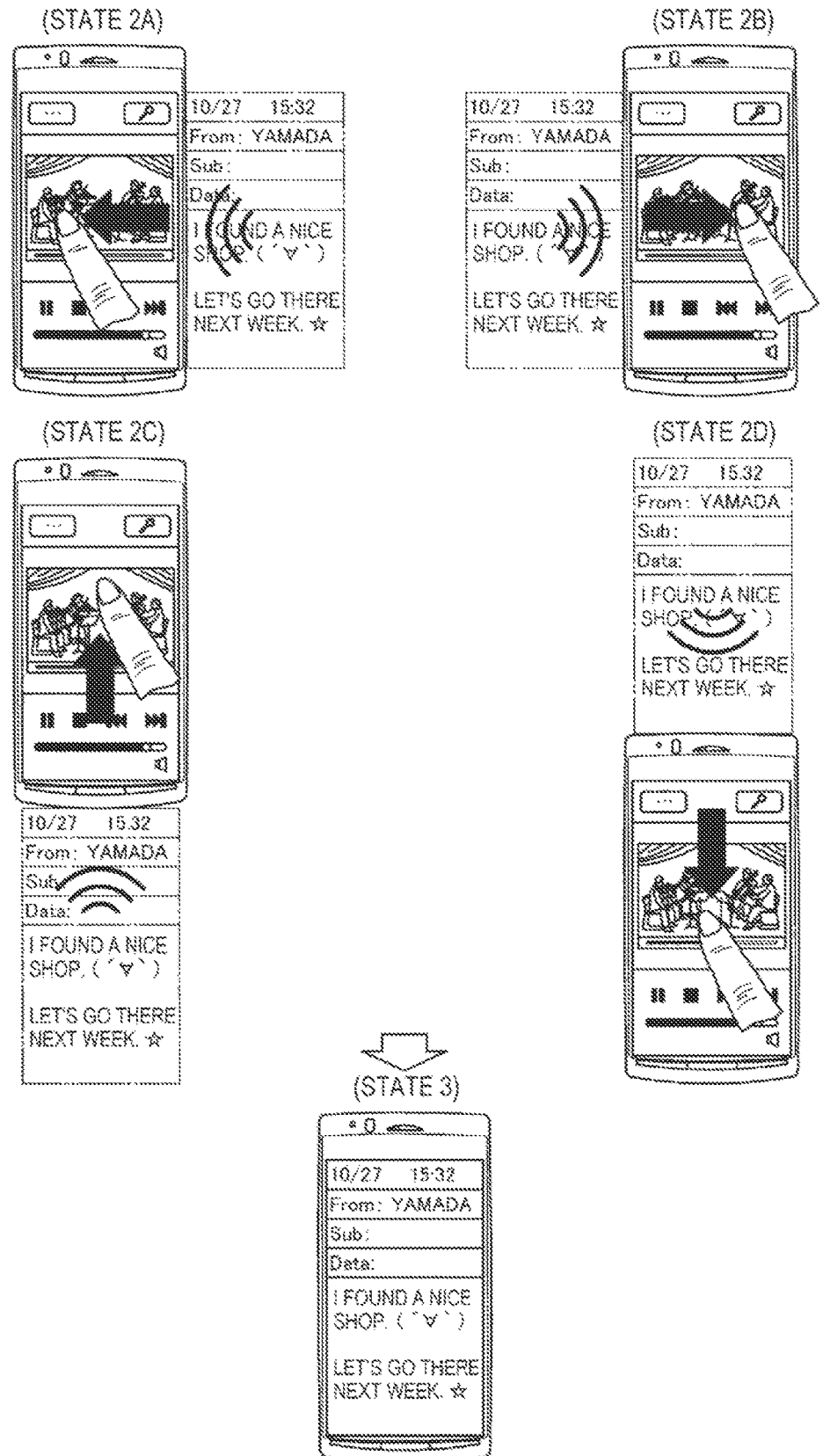
[Fig. 9]

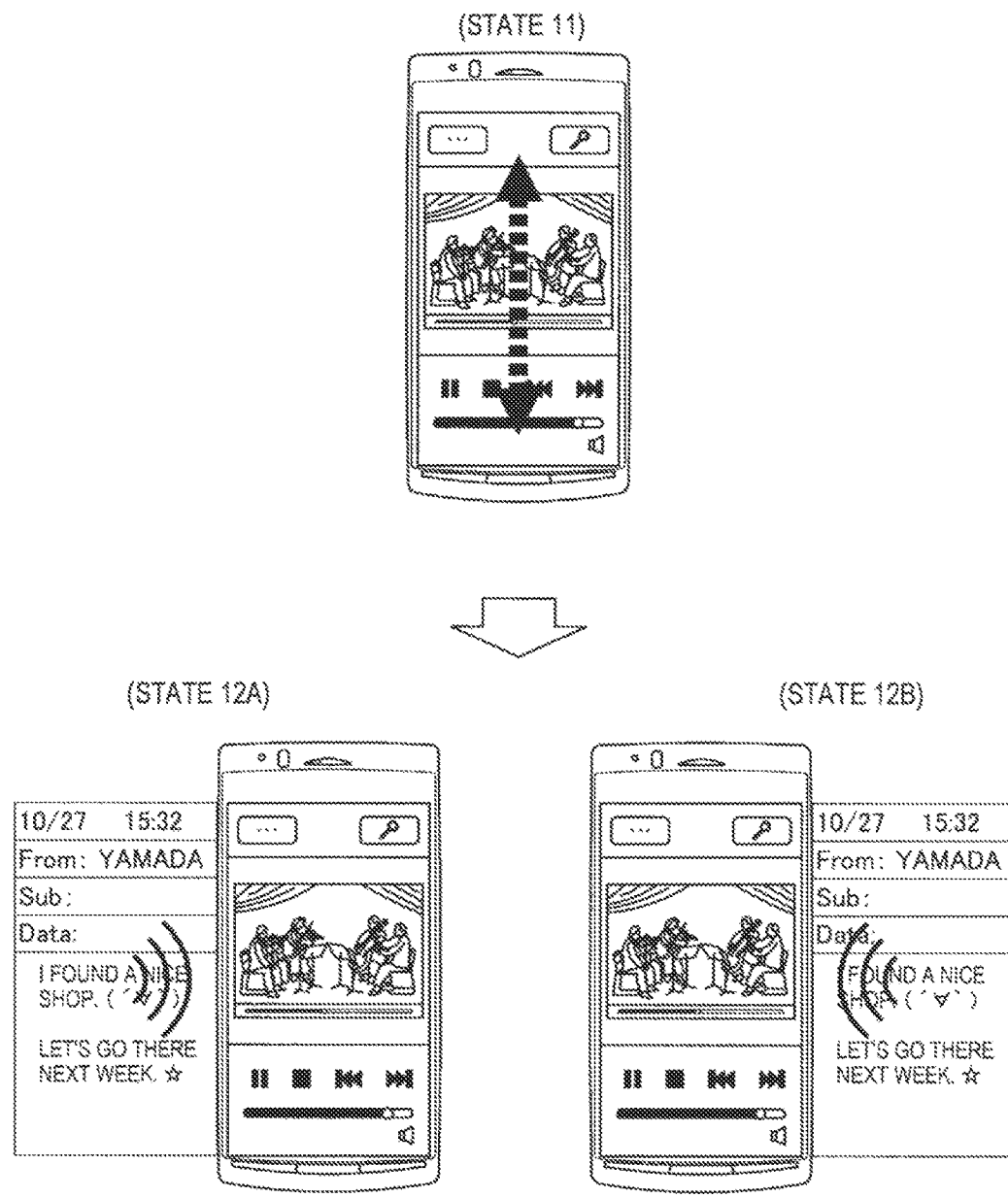

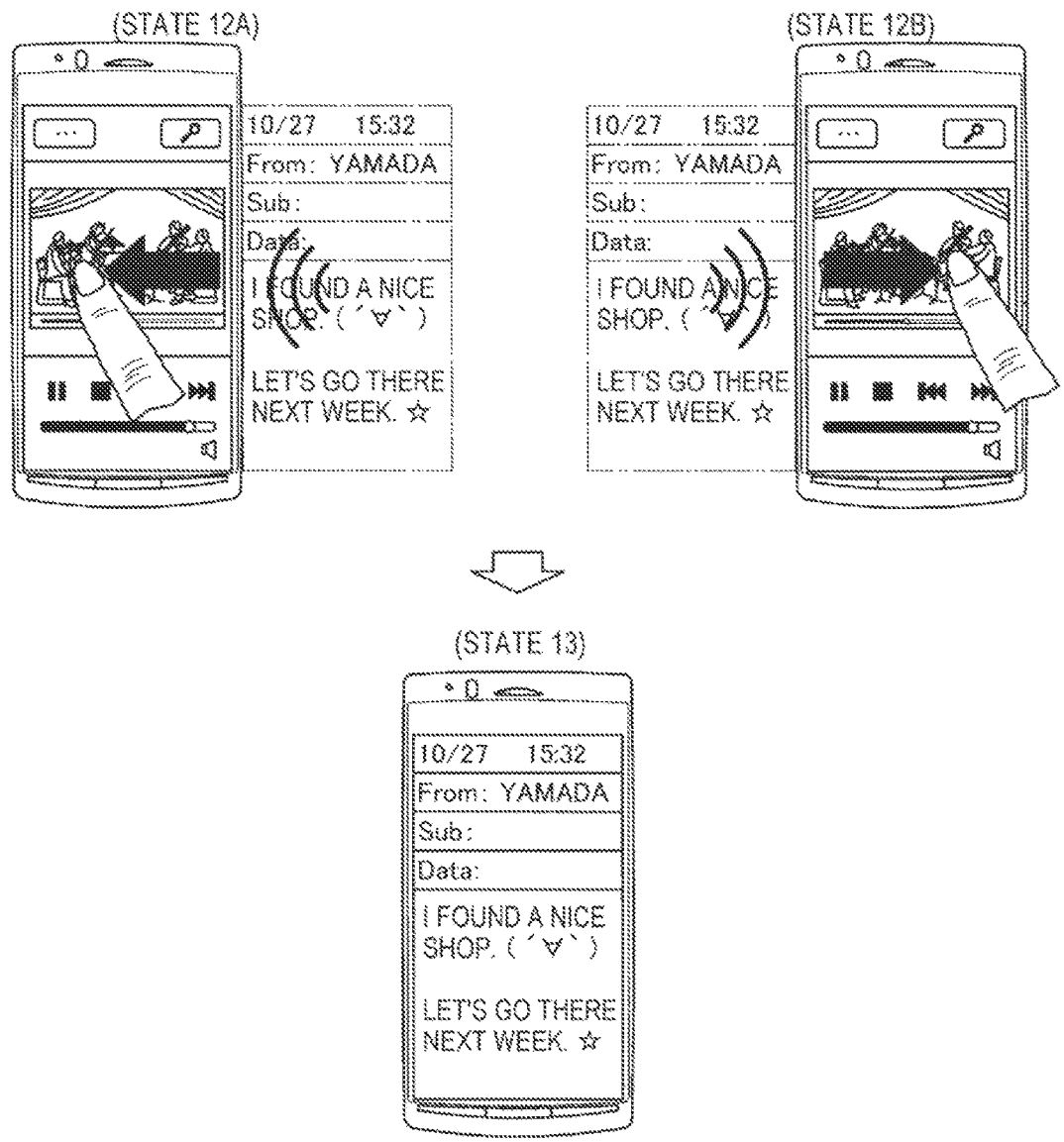
[Fig. 11]

[Fig. 12]
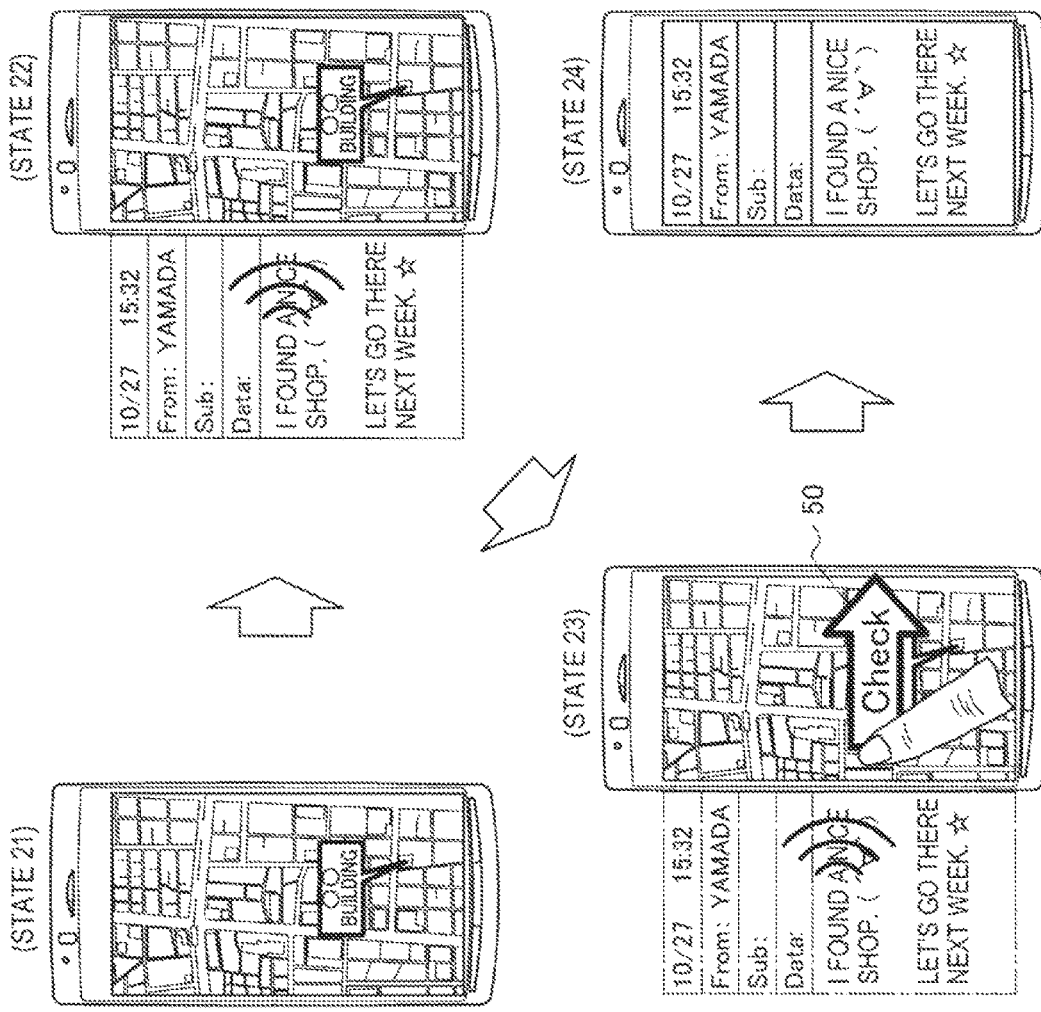

[Fig. 13]
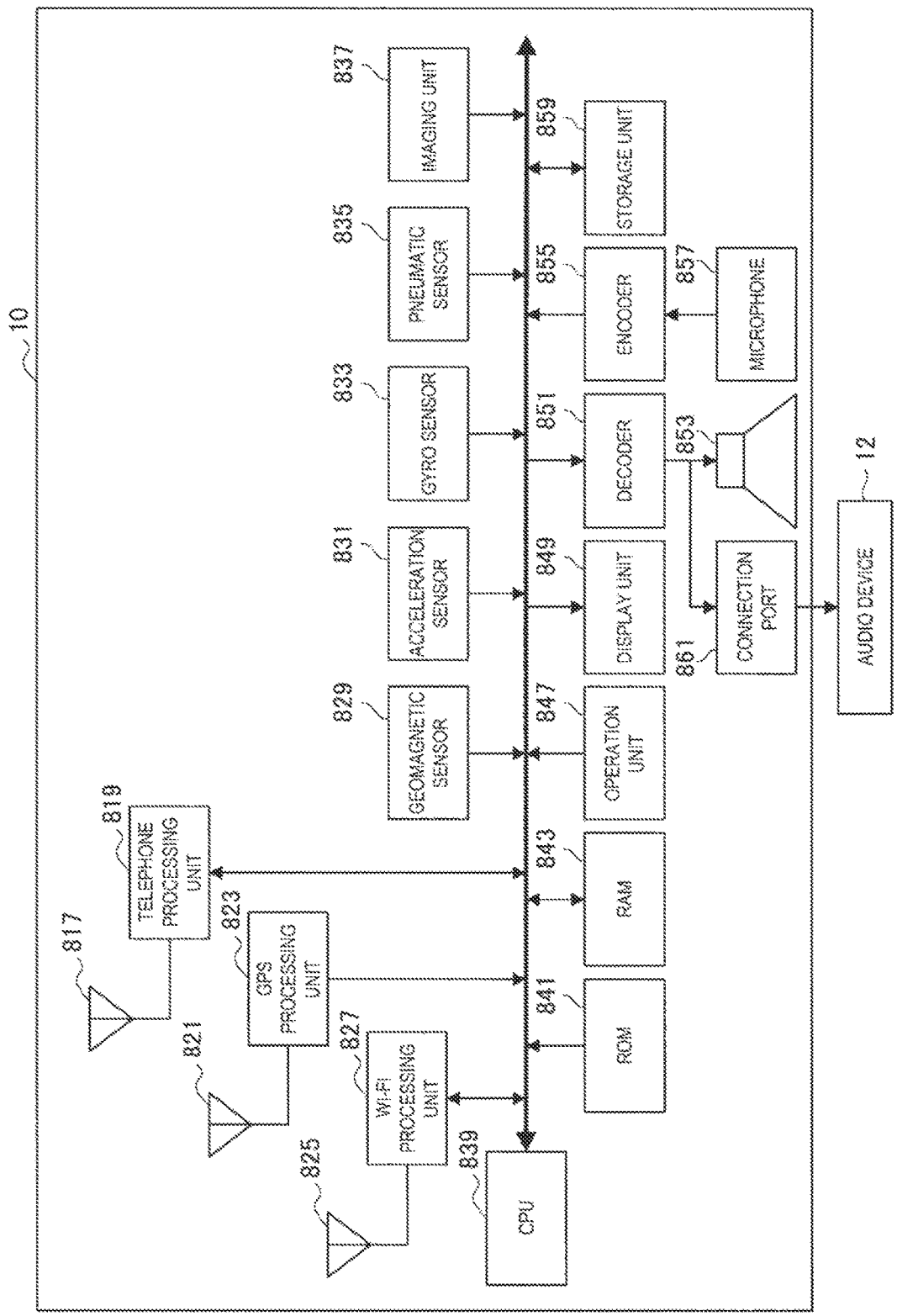

[Fig. 14]
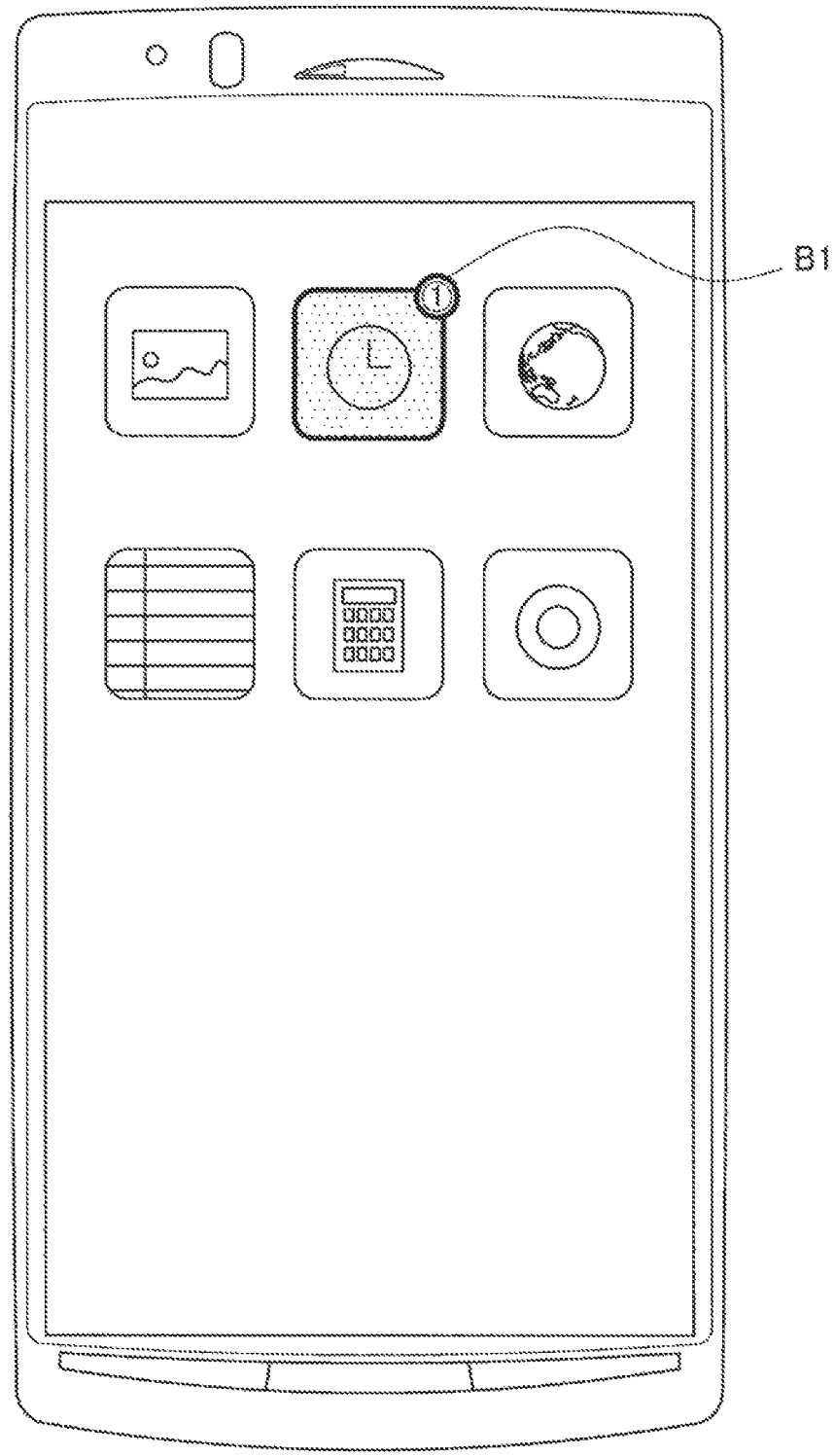

[Fig. 15]
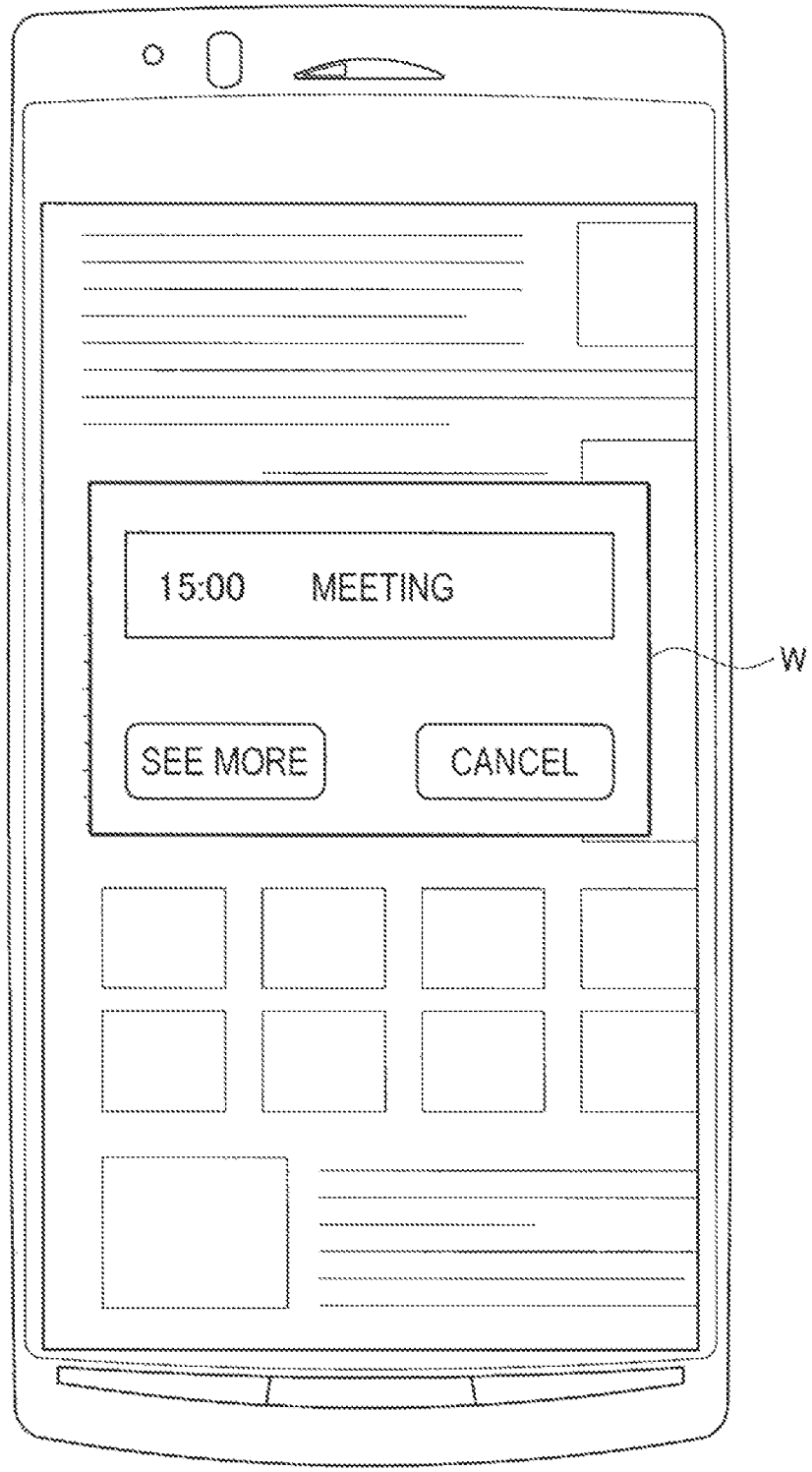

INFORMATION PROCESSING DEVICE, INFORMATION PROCESSING METHOD, AND PROGRAM FOR GENERATING A NOTIFICATION SOUND

CROSS REFERENCE TO PRIOR APPLICATION

This application is a National Stage Patent Application of PCT International Patent Application No. PCT/JP2013/000312 (filed on Jan. 23, 2013) under 35 U.S.C. § 371, which claims priority to Japanese Patent Application No. 2012-021887 (filed on Feb. 3, 2012), which are all hereby incorporated by reference in their entirety.

TECHNICAL FIELD

The present disclosure relates to an information processing device, an information processing method, and a program.

BACKGROUND ART

In recent years, the amount of information that users deal with has increased along with the development of information processing technologies. For at least this reason, questions of how information necessary for users will be extracted and how information will be presented to users have become greater matters of interest.

As an information presentation method, a presentation method using a screen display has been widely used. There have been proposed methods of presenting information using a screen display in accordance with changes in a device that a user uses and changes in information to be provided. However, there have been limitations even on presenting information using a screen display. Thus, a method of presenting information using sound has been proposed.

Japanese Patent Application Publication No. 2008-151766A, for example, discloses a method of outputting sound data having directivity based on the distance and direction from a current position of a device to a position that is set in advance. With the device, direction indication can be performed using only the auditory sense.

CITATION LIST

Patent Literature

PTL 1: JP 2008-151766A

SUMMARY

Technical Problem

It is still desirable to provide a way of presenting information more usefully to a user. Therefore, the present disclosure proposes generation of localization information of a notification sound that informs of notification information that is associated with information other than a screen currently displayed, as an example of a case in which information is provided using a sound.

Solution to Problem

According to an embodiment of the present disclosure, there is provided an information processing apparatus including a display control unit configured to initiate a selective displaying of content screens, and a sound output control unit configured to generate localization information of a notification sound associated with a first content screen that is not currently being displayed and initiate an outputting of the notification sound to a user in accordance with the localization information while a second content screen is being displayed.

According to such a configuration, the first content screen may not be displayed when the sound output control unit initiates the outputting of the notification sound. Furthermore, the sound output control unit may further be configured to initiate an outputting of the notification sound with a directivity that conveys to the user an operation direction for enabling a changing of current displaying from the second content screen to the first content screen.

Further, according to an embodiment of the present disclosure, there is provided an information processing apparatus including a display unit configured to selectively display content screens thereon, a sound output control unit configured to generate localization information of a notification sound associated with a first content screen that is not currently displayed by the display unit, and a sound output unit configured to output the notification sound to a user in accordance with the localization information while the display unit displays a second content screen thereon.

Still further, according to an embodiment of the present disclosure, there is provided an information processing method including generating localization information of a notification sound associated with a first content screen that is not currently displayed, and outputting, while a second content screen is being displayed to a user, the notification sound to the user in accordance with the localization information.

According to an embodiment of the present disclosure, there is provided a non-transitory computer-readable medium embodied with a program, which when executed by a computer, causes the computer to perform a method including generating localization information of a notification sound associated with a first content screen that is not currently displayed, and outputting, while a second content screen is being displayed to a user, the notification sound to the user in accordance with the localization information.

According to an embodiment of the present disclosure, there is provided an information processing device including an operation direction acquisition unit that acquires, from a first screen, an operation direction from which a second screen associated with a notification sound is displayed, and a localization information generation unit that generates localization information indicating a sound source position of the notification sound according to the operation direction.

According to such a configuration, the localization information of the notification sound according to the operation direction from which the second screen associated with the notification sound is displayed may be generated. Thus, a user who heard the notification sound output in accordance with the localization information can recognize the operation direction from which the second screen is displayed.

Further, according to an embodiment of the present disclosure, there is provided an information processing method including acquiring, from a first screen, an operation direction from which a second screen associated with a notification sound is displayed, and generating localization information indicating a sound source position of the notification sound according to the operation direction.

Further, according to an embodiment of the present disclosure, there is provided a program that causes a computer to function as an information processing device including an operation direction acquisition unit that acquires, from a first screen, an operation direction from which a second screen associated with a notification sound is displayed, and a localization information generation unit that generates localization information indicating a sound source position of the notification sound according to the operation direction.

Effects of Disclosure

According to the present disclosure as described above, it is possible to effectively convey information to a user by generating localization information of a notification sound that informs of notification information that is associated with information other than a screen currently displayed.

BRIEF DESCRIPTION OF DRAWINGS

FIG. 1 is an illustrative diagram showing the overview of functions mounted in an information processing device according to an embodiment of the present disclosure.

FIG. 2 is a block diagram showing a functional configuration of the information processing device according to an embodiment of the present disclosure.

FIG. 3 is a flowchart for describing a notification operation of the information processing device according to an embodiment of the present disclosure.

FIG. 4 is an illustrative diagram illustrating a first notification example of the information processing device according to an embodiment of the present disclosure.

FIG. 5 is an illustrative diagram illustrating a state in which a scroll operation is performed in the first notification example of the information processing device according to an embodiment of the present disclosure.

FIG. 6 is an illustrative diagram illustrating a second notification example of the information processing device according to an embodiment of the present disclosure.

FIG. 7 is an illustrative diagram illustrating a third notification example of the information processing device according to an embodiment of the present disclosure.

FIG. 8 is an illustrative diagram illustrating generation of a notification screen in fourth notification example of the information processing device according to an embodiment of the present disclosure.

FIG. 9 is an illustrative diagram illustrating an operation for the notification screen shown in FIG. 8.

FIG. 10 is an illustrative diagram illustrating a restriction on a generation position of the notification screen in the fourth notification example of the information processing device according to an embodiment of the present disclosure.

FIG. 11 is an illustrative diagram illustrating an operation for the notification screen shown in FIG. 10.

FIG. 12 is an illustrative diagram illustrating a modified example in which guidance information is displayed together with a notification sound in the fourth notification example of the information processing device according to an embodiment of the present disclosure.

FIG. 13 is a block diagram showing a hardware configuration of the information processing device according to an embodiment of the present disclosure.

FIG. 14 is an illustrative diagram showing an example of an alert notification method in the related art.

FIG. 15 is an illustrative diagram showing another example of the alert notification method in the related art.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Now, description will be provided in the following order.
1. Overview
2. Functional Configuration
3. Notification Operation
4. First Notification Example (Notification from an Application on a Home Screen)
5. Second Notification Example (Notification of a Screen Shifting Direction)
6. Third Notification Example (Notification of Completion of Buffering)
7. Fourth Notification Example (Generation of an Activation Screen of an Application Having Notification Information)
8. Hardware Configuration Example <1. Overview>

First, the overview of the technology proposed in present disclosure will be described with reference to FIGS. 1, 14, and 15. FIG. 1 is an illustrative diagram showing the overview of functions mounted in an information processing device according to an embodiment of the present disclosure. FIG. 14 is an illustrative diagram showing an example of an alert notification method in the related art. FIG. 15 is an illustrative diagram showing another example of the alert notification method in the related art.

As smartphones become more widely distributed, customizing functions of information processing devices for users by downloading applications is becoming more common. In addition, devices for multi-tasking-compliant have been widely distributed, and a plurality of functions can be activated at the same time. However, a display area of a display is physically limited. For these reasons, the display area may be shifted by scrolling or performing a shifting operation of a screen.

Various methods of informing a user of notification information that is generated, for example, by an application owing to a certain cause have been proposed. As illustrated in FIG. 14, for example, mostly on the home screen of a smartphone, icons of applications are arranged. On such a home screen, it is possible to inform the user of the presence of notification information and the number of notification information pieces by numbering the pieces of notification information on the icon of an application that has information to be notified of.

In addition, FIG. 15 illustrates an example of a method of informing a user of notification information when the notification information is generated elsewhere than the screen currently displayed. According to the method of FIG. 15, a pop-up window W that includes the notification information may be displayed on the screen being displayed. The pop-up window W may include, for example, a button that receives an action for the notification information. The user may be able to ascertain details of the notification information by operating the button.

In the method illustrated in FIG. 15, however, the user should suspend the operation being performed. Moreover, there is a case in which a process executed in the background is halted. In consideration of the operability by the user, such a halt of an operation that a user desires is not favorable. Therefore, the present disclosure proposes a method of providing a user with notification information without halting an operation that the user desires, by using a sound.

As illustrated in FIG. 1, for example, the present disclosure provides a user with notification information using a sound having directivity. Herein, when an application of an icon set on the screen on the right side of the screen that is currently displayed has notification information, a notification sound may be set to be heard from the right side. With this configuration, the user can ascertain the direction of an operation for acquiring the notification information based on the direction of the notification sound. Hereinbelow, an information processing device for realizing the function will be described.

<2. Functional Configuration>

Herein, a functional configuration of the information processing device 10 according to an embodiment of the present disclosure will be described with reference to FIG. 2. FIG. 2 is a block diagram illustrating the functional configuration of the information processing device according to an embodiment of the present disclosure.

The information processing device 10 may be an information processing device including, for example, a mobile telephone including a smartphone, a PUS (Personal Handyphone system), a portable music reproduction device, a portable video processing device, a portable game device, an imaging device, a navigation system, a PC (Personal Computer), a home video processing device (a DVD recorder, a video deck, or the like), a home game device, a home appliance, and the like.

The information processing device 10 may include mainly an operation unit 105, an operation information acquisition unit 110, a display unit 115, a display control 120, a sound output unit 125, and a sound output control unit 130.

(Operation Unit 105)

The operation unit 105 may have a function of generating an input signal for performing an operation that a user desires. The operation unit 105 may include, for example, an input section such as a touch panel, a mouse, a keyboard, a button, a microphone, a switch, a lever, and various sensors that are used to input information by a user, an input control circuit that generates and outputs input signals based on an input by a user, or the like. For example, the operation unit 105 can generate and output an input signal based on an operation by detecting the operation that a user performs on a touch panel. In addition, the operation unit 105 can generate and output input signals based on tilt information of the housing of the information processing device 10 acquired by a tilt sensor.

(Operation Information Acquisition Unit 110)

The operation information acquisition unit 110 may have a function of acquiring operation information input by a user. For example, the operation information acquisition unit 110 can acquire input signals output from the operation unit 105 as operation information. The information processing device 10 can operate based on the operation information acquired by the operation information acquisition unit 110. Note that the operation information acquisition unit 110 is an example of an operation direction acquisition unit that acquires, from a first screen, an operation direction from which a second screen associated with a notification sound is displayed.

(Display Unit 115)

The display unit 115 is an example of an output device, and may be a display device such as a liquid crystal display (LCD) device, or an organic. EL (or OLED: Organic Light Emitting Diode) display device. The display unit 115 can operate according to the control of the display control unit 120.

(Display Control Unit 120)

The display control unit 120 may have a function of controlling the content of a display screen to be provided to a user. In addition, the display control unit 120 can control the content of the display screen based on operation information acquired by the operation information acquisition unit 110. For example, the display control unit 120 can cause the display screen to be scrolled according to a scroll operation performed by a user. In addition, the display control unit 120 can cause the display screen to be enlarged, reduced, or undergo screen shifting according to the operation information. Further, the display control unit 120 is an example of a generation unit that may generate a screen relating to notification information when the generation of the notification information is detected. In an e-mail application, for example, when notification information that informs of the reception of a new e-mail is generated, the display control unit 120 can cause a notification screen that notifies of the new e-mail to be activated so as to arrange the notification screen to be displayed if a user performs a scroll operation from a screen currently displayed. Note that the notification screen in this case may be a text display screen containing the text of the e-mail, or a list screen of received e-mails. In addition, as will be described below, the display control unit 120 may be an example of a guidance information display control unit that causes guidance information indicating an operation direction from which a screen associated with the notification information is displayed to be displayed. Further, the display control unit 120 is an example of a generation unit that generates a second screen associated with notification information when the generation of the notification information is detected.

(Sound Output Unit 125)

The sound output unit 125 may have a function of outputting a sound signal. The sound output unit 125 may be, for example, a speaker. In addition, the sound output unit 125 may be an output terminal that outputs a sound signal to a sound output device such as headphones. The sound output unit 125 can operate according to the control of the sound output control unit 130. Note that the sound output device used here can output stereophony according to localization information of a sound.

(Sound Output Control Unit 130)

The sound output control unit 130 may have a function of outputting a sound to a user. In addition, the sound output control unit 130 is an example of a localization information generation unit that may generate localization information indicating a sound source position. The sound output control unit 130 can generate localization information indicating a sound source position of a notification sound from the first screen according to an operation direction from which the second screen associated with the notification sound is displayed. In such a case, the sound output control unit 130 can generate the localization information according to the distance between the first screen and the second screen. The first screen may be, for example, a screen currently displayed. The distance between the first screen and the second screen may change every time the screen currently displayed is changed. For this reason, the sound output control unit 130 can update the localization information every time a change is made in the screen currently displayed. The sound output control unit 130 can control the output of a sound so that the volume increases as the sound source position becomes closer.

The sound output control unit 130 may cause the sound source position of the notification sound to be merely fixedly positioned in a direction according to an operation direction from which a screen associated with the notification sound is displayed. In addition, humans tend to more easily perceive the direction of a sound of which the sound source position changes than that of a sound from a merely fixed position. For this reason, after the sound source position of the notification sound is changed, for example, the sound output control unit 130 may set the arrival point to be a direction according to an operation direction from which a screen associated with the notification sound is displayed. In a screen currently displayed, for example, when the screen associated with the notification sound is displayed according to a scroll operation from the right side to the left side, the sound output control unit 130 may generate localization information in which the sound source position of the notification sound is fixed to the right side of the user. In addition, in such a case, after the sound source position of the notification sound is changed, the sound output control unit 130 may generate localization information so as to be fixed on the left side of the user.

In addition, when the orientation of the display screen is changed according to the tilt of the information processing device 10, the sound output control unit 130 may change the sound source position of the notification sound according to changes in the orientation of the display screen. The sound output control unit 130 may be an example of an acoustic processing unit that implements a stereophonic process for a notification sound.

The localization information generated by the sound output control unit 130 will be described in more detail later by exemplifying a plurality of scenes. Note that the notification sound herein may be a notification sound that informs of, for example, the reception of an e-mail, but is not limited thereto. When shifting is performed from a reproduction screen used when a moving image is reproduced to a list screen of moving images, the sound of the moving image may be used as a notification sound for notifying of the direction of the shifting. In this case, the sound of the moving image may also belong to a notification sound.

Hereinabove, examples of the functions of the information processing device 10 according to embodiments are shown. Respective constituent elements described above may be configured using general-purpose members or circuits or may be configured using hardware specialized for the functions of the respective constituent elements. In addition, the functions of the respective constituent elements may be fulfilled by reading a control program from a storage medium such as a ROM (Read Only Memory) or a RAM (Random Access Memory) storing the control program describing procedures in which an arithmetic operation unit such as a CPU (Central Processing Unit) realizes the functions and by interpreting the program. Thus, it is possible to appropriately change a configuration to be used according to the level of the technology at a time when the present embodiment is implemented.

A computer program for realizing each of the functions of the information processing device 10 according to embodiments as described above can be created and installed in a personal computer, or the like. In addition, a recording medium that stores such a computer program and which is readable on the computer can also be provided. The recording medium may include, for example, a magnetic disk, an optical disc, a magneto optical disc, a flash memory, and the like. In addition, the computer program may be delivered through, for example, the Internet, without using the recording medium.

<3. Notification Operation>

Next, a notification operation of the information processing device according to an embodiment of the present disclosure will be described with reference to FIG. 3. FIG. 3 is a flowchart for describing a notification operation of the information processing device according to an embodiment of the present disclosure.

First, the information processing device 10 may determine whether there is notification information or not (S100). When a setting is made to give notification to a user by detecting any cause by an application operated inside the information processing device 10, for example, the information processing device 10 can determine whether there is notification information or not based on whether the cause of notification has been detected or not.

When it is determined that there is notification information in the determination of Step S100, the sound output control unit 130 may generate localization information of a notification sound that informs of the notification information (S105). Then, the sound output control unit 130 outputs the notification sound based on the generated localization information (S107).

Next, the display control unit 120 may determine whether there is a change in a display screen (S110). When it is determined here that there is a change in the display screen, the sound output control unit 130 may update the localization information (S115). On the other hand, when it is determined that there is no change in the display screen in the determination of Step S110, the process of Step S115 may be omitted.

Next, the sound output control unit 130 may determine whether a predetermined time has elapsed or not (S120). The predetermined time used here may be a time decided in advance as a time taken to output the notification sound. The predetermined time may have, for example, a value set in advance in the information processing device 10 by the user. Alternatively, the predetermined time may have a value set in advance as a predetermined value of an application.

When it is determined that the predetermined time has elapsed in the determination of Step S120, the sound output control unit 130 may stop output of the notification sound (S125), and may repeat the process from Step S100. On the other hand, when it is determined that the predetermined time has not elapsed in the determination of Step S120, the process may return to Step S110, and the notification sound may be output while updating of the localization information is repeated until the predetermined time elapses.

As described above, the notification sound that informs of the notification information may be output as a sound signal having directivity based on the positional relationship between a screen associated with the notification information and a screen currently displayed. With this configuration, the user can instantly know the operation direction from which the screen associated with the notification information is displayed from the direction in which the notification sound is heard. Hereinbelow, the notification operation of the information processing device 10 will be described by exemplifying a plurality of specific scenes.

<4. First Notification Example (Notification from an Application on a Home Screen)>

Next, a first notification example of the information processing device according to an embodiment of the present disclosure will be described with reference to FIGS. 4 and 5. FIG. 4 is an illustrative diagram illustrating the first notification example of the information processing device according to an embodiment of the present disclosure. FIG. 5 is an illustrative diagram illustrating a state in which a scroll operation is performed in the first notification example of the information processing device according to an embodiment of the present disclosure.

For example, a case in which a home screen includes four screens of a screen SC1, a screen SC2, a screen SC3, and a screen SC4 displayed according to scroll operations will be considered. When the screen SC2 among the four screens is displayed as illustrated in FIG. 4 and the generation of notification information of an application indicated by an icon 30 displayed on the screen SC4 is detected, the sound output control unit 130 may generate localization information of a notification sound that informs of the notification information based on an operation direction from which the screen SC4 is displayed from the screen SC2 currently displayed. In this case, the sound output control unit 130 can generate the localization information so that the notification sound is heard from the right side.

In addition, when an operation of changing the display state of the screen currently displayed is detected, the sound output control unit 130 can update the localization information according to the operation. Assuming that a scroll operation is performed from the right to the left side in the state shown in FIG. 4, for example, and the screen SC3 comes to serve as the screen currently displayed as illustrated in FIG. 5. At this moment, the sound output control unit 130 can generate the localization information based on an operation direction from which the screen SC4 associated with notification information is displayed from the screen SC3 currently displayed and the distance between the screen SC3 and the screen SC4. In this case, it may be desirable to set control so that the notification sound is heard louder in the state shown in FIG. 5 than in the state shown in FIG. 4. With this configuration, the user can know the operation direction from which the screen SC4 associated with the notification sound is displayed based on the direction in which the notification sound is heard. In addition, the user can perceive the distance from the screen currently displayed to the screen associated with the notification sound from the volume of the notification sound.

<5. Second Notification Example (Notification of a Screen Shifting Direction)>

Next, a second notification example of the information processing device according to an embodiment of the present disclosure will be described with reference to FIG. 6. FIG. 6 is an illustrative diagram illustrating the second notification example of the information processing device according to an embodiment of the present disclosure.

Herein, a case is illustrated in which, when a moving image is reproduced, a screen is shifted to the lateral direction after a "return" button is pressed. In this case, the sound output control unit 130 can provide an animation of a sound by changing a sound source position in accordance with the shifting of the screen. At this moment, the user hears the notification sound as if the sound were fading away to the right side while the screen for reproducing the moving image is shifted to the right side. Accordingly, the positional relationship between the direction in which the screen for the reproduction is shifted and the return button can be indicated to the user. In this case, for example, a sound of the moving image may be used as the notification sound. Alternatively, another alarm sound may be used as the notification sound.

<6. Third Notification Example (Notification of Completion of Buffering)>

Next, a third notification example of the information processing device according to an embodiment of the present disclosure will be described with reference to FIG. 7.

FIG. 7 is an illustrative diagram illustrating the third notification example of the information processing device according to an embodiment of the present disclosure.

An animation of a notification sound may be used to notify of the completion of buffering in reproduction of a moving image. As illustrated in FIG. 7, for example, a case is considered in which, in a moving image reproduction screen SC21, the moving image is in the state of being no longer reproduced due to buffering of the moving image. At this moment, when a user causes a moving image list screen SC22 to be displayed by pressing the "return" button, performing a scroll operation, or the like, the user can operate the moving image list screen SC22. Then, when the moving image is in the state of being reproduced after the buffering, the sound output control unit 130 can output a notification sound as if the notification sound were heard from the direction in which the moving image reproduction screen SC 21 is shifted. Herein, the sound output control unit 130 can control the output of the notification sound so that the notification sound is heard from the right side. The notification sound used here may be an alert sound or a sound of the moving image reproduced on the moving image reproduction screen SC21.

Accordingly, the user can grasp the completion of the buffering. In addition, when shifting can be performed between the moving image reproduction screen SC 21 and the moving image list screen SC22 using a scroll operation, the user can grasp (recall) the direction of the scroll operation.

<7. Fourth Notification Example (Generation of an Activation Screen of an Application Having Notification Information)>

Next, a fourth notification example of the information processing device according to an embodiment of the present disclosure will be described with reference to FIGS. 8 to 12. FIG. 8 is an illustrative diagram illustrating generation of a notification screen in the fourth notification example of the information processing device according to an embodiment of the present disclosure. FIG. 9 is an illustrative diagram illustrating an operation for the notification screen shown in FIG. 8. FIG. 10 is an illustrative diagram illustrating a restriction on a generation position of the notification screen in the fourth notification example of the information processing device according to an embodiment of the present disclosure. FIG. 11 is an illustrative diagram illustrating an operation for the notification screen shown in FIG. 10. FIG. 12 is an illustrative diagram illustrating a modified example in which guidance information is displayed together with a notification sound in the fourth notification example of the information processing device according to an embodiment of the present disclosure.

The first to third notification examples described above are examples of alert notification from a screen that is activated from the beginning. Herein, an example of notification from an application that is not activated will be considered. When there is a notification from an application that is not activated, a user can ascertain information relating to the notification with a few operations by activating and automatically arranging a screen relating to the notification. At this moment, the untimely display of the notification as well as the screen relating thereto may disturb user operation. Thus, herein, screens may be arranged in such a way that a screen that is activated by a one-step operation (for example, a scroll operation in any direction) may be displayed from a screen currently displayed.

Herein, the user may not be able to perceive in which direction an operation should be performed on the screen that is automatically arranged. Thus, according to the present disclosure, the user may be able to instantly perceive the operation direction based on the output of a notification sound that informs the direction of automatic arrangement.

As illustrated in FIG. 8, a moving image reproduction screen m displayed in a state 1. When the reception of an e-mail occurs here as notification information, the display control unit 120 may arrange an e-mail display screen on any of the upper, lower, right, and left sides of the moving image reproduction screen as shown in a state 2. At this moment, the sound output control unit 130 can control an output of a notification sound having directivity from the arranged screen. Note that, herein, states 2A, 2B, 2C, and 2D are collectively referred to as the state 2 without discrimination. The same is applied hereinbelow. In the state 2A, for example, the e-mail display screen is arranged on the right side of the screen currently displayed. At this moment, the user hears the notification sound from the right side. In addition, in the state 2B, the e-mail display screen is arranged on the left side of the screen currently displayed. At this moment, the user hears the notification sound from the left side. In addition, in the state 2C, the e-mail display screen is arranged on the lower side of the screen currently displayed. At this moment, the user hears the notification sound from the lower or back side. In addition, in the state 2D, the e-mail display screen is arranged on the upper side of the screen currently displayed. At this moment, the user hears the notification sound from the upper or front side. Herein, the arranged screen may be set to be a display screen containing text of the e-mail, but the present technology is not limited to the example. A screen relating to notification may be, for example, an e-mail list screen.

In addition, as illustrated in FIG. 9, when a scroll operation is performed from the screen of the state 2, the e-mail display screen may be displayed on the display unit 115 as shown in a state 3. In this manner, notification information can be ascertained with a one-step operation by automatically arranging a screen relating to notification. At this moment, by arranging the sound source position of the notification sound according to the operation direction from which the screen relating to the notification is displayed, the user can perceive the position in which the screen relating to the notification is arranged and the operation direction from which the screen is displayed from the directions of the notification sound.

Further, the display control unit 120 can restrict the position in which the screen relating to the notification is arranged. For example, the display control unit 120 may restrict the position in which the screen relating to the notification based on an operation direction that can be accepted by a screen that has been being displayed when notification information is generated. Referring to FIG. 10, for example, a case is considered in which a screen displayed in a state 11 is a screen on which a scroll operation can be performed in the upper-lower direction of the screen.

In this case, when the display control unit 120 arranges the e-mail display screen so as to be displayed by a scroll operation in the upper-lower direction, the user may unintentionally cause the e-mail display screen to be displayed. In other words, it may be difficult for the user to discriminate whether the scroll operation in the upper-lower direction is a scroll operation set in the moving image reproduction screen that has been displayed in the state 11 or a scroll operation for displaying the e-mail display screen. Thus, the display control unit 120 can arrange the e-mail display screen so that the e-mail display screen is displayed by an operation performed in the direction orthogonal to the upper-lower direction that is the operation direction accepted in the moving image reproduction screen (state 12).

As illustrated in FIG. 11, also on the screen displayed in the state 12, it is possible to display the e-mail display screen in such a way that the user determines the operation direction from the direction in which the notification sound is heard and performs a scroll operation (state 13).

In addition, the operation direction from which notification information is displayed may be provided to the user by displaying guidance information 50 that guides a scroll operation in a predetermined direction in addition to the notification sound. As illustrated in FIG. 12, for example, it is assumed that the user has operated a map application in a state 21. In this case, when notification information of e-mail reception is generated, the display control unit 120 may arrange the e-mail display screen on the left side of the screen currently displayed (state 22). At this moment, the sound output control unit 130 may set the sound source position of the notification sound to be the left side thereof. In addition, the display control unit 120 can cause the guidance information 50 to be further displayed over the display screen in a superimposing manner. The guidance information 50 may be, for example, an arrow indicating the operation direction from which the e-mail display screen is displayed as illustrated in FIG. 12. When the user performs a scroll operation in the direction indicated by the guidance information 50, the e-mail display screen may be displayed (state 24).

<8. Hardware Configuration Example>

Next, a hardware configuration example of the information processing device according to an embodiment of the present disclosure will be described with reference to FIG. 13. FIG. 13 is a block diagram showing the hardware configuration of the information processing device according to an embodiment of the present disclosure.

Herein, an example of the configuration of the information processing device 10 will be described. Referring to FIG. 13, the information processing device 10 may include, for example, a telephone network antenna 817, a telephone processing unit 819, a GPS antenna 821, a GPS processing unit 823, a Wi-Fi antenna 825, a Wi-Fi processing unit 827, a geomagnetic sensor 829, an acceleration sensor 831, a gyro sensor 833, a pneumatic sensor 835, an imaging unit 837, a CPU (Central Processing Unit) 839, a ROM (Read Only Memory) 841, a RAM (Random Access Memory) 843, an operation unit 847, a display unit 849, a decoder 851, a speaker 853, an encoder 855, a microphone 857, a storage unit 859, and a connection port 861. Note that the hardware configuration shown herein is an example, and a part of the constituent elements may be omitted. In addition, it is needless to say that constituent elements other than those shown herein may be further included.

(Telephone Network Antenna 817)

The telephone network antenna 817 is an example of an antenna having a function of wirelessly connecting to a mobile telephone network for phone calls and communication. The telephone network antenna 817 can supply call signals received through the mobile telephone network to the telephone processing unit 819.

(Telephone Processing Unit 819)

The telephone processing unit 819 may have a function of performing various signal processes for signals transmitted and received by the telephone network antenna 817. The telephone processing unit 819 may perform various signal processes for sound signals, for example, input through the microphone 857 and encoded by the encoder 855, and can supply the signals to the telephone network antenna 817. In addition, the telephone processing unit 819 may perform various signal processes for sound signals supplied from the telephone network antenna 817 and can supply the signals to the decoder 851.

(GPS Antenna 821)

The GPS antenna 821 is an example of an antenna that may receive signals from positioning satellites. The GPS antenna 821 can receive GPS signals from a plurality of GPS satellites, and can input the received GPS signals to the GPS processing unit 823.

(GPS Processing Unit 823)

The GPS processing unit 823 is an example of a computation unit that may compute position information based on signals received from positioning satellites. The GPS processing unit 823 may compute current position information based on a plurality of UPS signals input from the GPS antenna 821, and output the computed position information. Specifically, the UPS processing unit 823 may compute each of the positions of the UPS satellites from orbital data of the GPS satellites, and may compute the distance from each UPS satellite to the information processing device 10 based on a difference in time between the transmission time and the reception of each UPS signal. Then, it may be possible to compute the current three-dimensional position based on the computed position of each UPS satellite and the distance from each UPS satellite to the information processing device 10. Note that the orbital data of each GPS satellite used here may also be included, for example, in the UPS signal. Alternatively, the orbital data of each UPS satellite may be acquired from an external server through the Wi-Fi antenna 825.

(Wi-Fi Antenna 825)

The Wi-Fi antenna 825 may be an antenna having a function of transmitting and receiving communication signals with, for example, a wireless LAN (Local Area Network) communication network in accordance with the specifications of Wi-Fi. The Wi-Fi antenna 825 can supply the received signals to the Wi-Fi processing unit 827.

(Wi-Fi Processing Unit 827)

The Wi-Fi processing unit 827 may have a function of performing various signal processes for signals supplied from the Wi-Fi antenna 825. The Wi-Fi processing unit 827 can supply, for example, digital signals generated from analog signals to the CPU 839.

(Geomagnetic Sensor 829)

The geomagnetic sensor 829 may be a sensor that detects geomagnetism as a voltage value. The geomagnetic sensor 829 may be a triaxial geomagnetic sensor that detects geomagnetism in each of the X axis, Y axis, and Z axis directions. The geomagnetic sensor 829 can supply the detected geomagnetic data to the CPU 839.

(Acceleration Sensor 831)

The acceleration sensor 831 may be a sensor that detects an acceleration as a voltage value. The acceleration sensor 831 may be a triaxial acceleration sensor that detects each acceleration along the X axis, Y axis, and Z axis directions. The acceleration sensor 831 can supply the detected acceleration data to the CPU 839.

(Gyro Sensor 833)

The gyro sensor 833 may be a kind of measuring instrument that detects an angle and an angular velocity of an object. The gyro sensor 833 may be a triaxial gyro sensor that detects a velocity at which a rotation angle around the X axis, the axis, and the Z axis changes (angular velocity) as a voltage value. The gyro sensor 833 can supply the detected angular velocity data to the CPU 839.

(Pneumatic Sensor 835)

The pneumatic sensor 835 may be a sensor that detects ambient air pressure as a voltage value. The pneumatic sensor 835 may detect air pressure using a predetermined sampling frequency, and can supply the detected air pressure data to the CPU 839.

(Imaging Unit 837)

The imaging unit 837 may have a function of imaging a still image or a moving image through a lens according to the control of the CPU 839. The imaging unit 837 may cause a captured image to be stored in the storage unit 859.

(CPU 839)

The CPU 839 may function as an arithmetic processing unit and a control unit, and may control the overall operations in a mobile terminal 30 according to various programs. In addition, the CPU 839 may be a microprocessor. The CPU 839 can realize various functions according to various programs.

(ROM 841, RAM 843)

The ROM 841 can store programs, arithmetic operation parameters, and the like that the CPU 839 uses. The RAM 843 can temporarily store the programs used in the execution of the CPU 839, the parameters that appropriately change in the execution, and the like.

(Operation Unit 847)

The operation unit 847 may have a function of generating input signals for performing an operation that a user 5 desires. The operation unit 847 may include, for example, an input section such as a touch sensor, a mouse, a keyboard, a button, a microphone, a switch, and a lever that are used to input information by the user 5, an input control circuit that generates input signals based on an input by the user 5 and outputs the signals to the CPU 839, and the like.

(Display Unit 849)

The display unit 849 is an example of an output device, and may be a display device such as a liquid crystal display (LCD) device, and an organic EL (or OLED: Organic Light Emitting Diode) display device. The display unit 849 can provide the user 5 with information by displaying screens.

(Decoder 851, Speaker 853)

The decoder 851 may have a function of performing decoding, analog conversion, and the like for input data according to the control of the CPU 839. The decoder 851 may perform decoding, analog conversion, and the like of sound data input through, for example, the telephone network antenna 817 and the telephone processing unit 819, and can output sound signals to the speaker 853. In addition, the decoder 851 may perform decoding, analog conversion, and the like of sound data input through, for example, the Wi-Fi antenna 825 and the Wi-Fi processing unit 827, and can output sound signals to the speaker 853. The speaker 853 can output sounds based on the sound signals supplied from the decoder 851.

(Encoder 855, Microphone 857)

The encoder 855 may have a function of performing digital conversion, encoding, and the like of input data according to the control of the CPU 839. The encoder 855 may perform digital conversion, encoding, and the like of sound signals input from the microphone 857 and can output sound data. The microphone 857 can collect sounds and output the sounds as sound signals.

(Storage Unit 859)

The storage unit 859 may be a device for storing data, and can include a storage medium, a recording device for recording data on a storage medium, a read-out device for reading data from a storage medium, a deleting device for deleting data recorded on a storage medium, and the like. As a storage medium herein, for example, a non-volatile memory such as a flash memory, an MRAM (Magnetoresistive Random Access Memory), a FeRAM (Ferroelectric Random Access Memory), a PRAM (Phase-Change Random Access Memory), and an EEPROM (Electronically Erasable and Programmable Read Only Memory), a magnetic recording medium such as an HDD (Hard Disk Drive), and the like may be used.

(Connection Port 861)

The connection port 861 may be a connection unit for connecting to an audio device 12. Herein, the audio device 12 may be, for example, headphones or a speaker separate from the information processing device 10. The information processing device 10 can output sound signals from the audio device 12 via the connection port 861.

Hereinabove, embodiments of the present disclosure have been described in detail with reference to accompanying drawings, but the technical scope of the present disclosure is not limited to the above-described embodiments. It should be understood by those skilled in the art that various modifications, combinations, sub-combinations and alterations may occur depending on design requirements and other factors insofar as they are within the scope of the appended claims or the equivalents thereof, and they are of course understood so as to belong to the technical scope of the present disclosure.

In the embodiments described above, for example, some or all of the functions set to be performed inside the information processing device 10 that may be a portable electronic device may be performed in distributed processes by a plurality of information processing devices. The hardware configuration for executing the functions of the present technology can be appropriately changed according to the level of the technology at a time when the embodiments are implemented.

Furthermore, in the present specification, the steps described in the flowcharts may include not only processes performed in a time series manner along the described order but may also include processes executed in parallel or in an individual manner, although not necessarily performed in a time series. In addition, it is needless to say that even in steps processed in a time series manner, the order can be appropriately changed.

Additionally, the present technology may also be configured as below.

(1) An information processing apparatus including:
a display control unit configured to initiate a selective displaying of content screens; and
a sound output control unit configured to generate localization information of a notification sound associated with a first content screen that is not currently being displayed and initiate an outputting of the notification sound to a user in accordance with the localization information while a second content screen is being displayed.

(2) The information processing apparatus of (1), wherein the first content screen is not being displayed when the sound output control unit initiates the outputting of the notification sound.

(3) The information processing apparatus of (1), wherein the sound output control unit is further configured to initiate an outputting of the notification sound with a directivity that conveys to the user an operation direction for enabling a changing of current displaying from the second content screen to the first content screen.

(4) The information processing apparatus of (3), wherein the display control unit is further configured to initiate a selective changing of current displaying from the second content screen to the first content screen based on a scroll operation initiated by the user and corresponding to the operation direction.

(5) The information processing apparatus of (1), wherein the localization information indicates a sound source position of the notification sound.

(6) The information processing apparatus of (5), wherein a volume of the notification sound is higher when the sound source position of the notification sound is located closer to the displayed second content screen.

(7) The information processing apparatus of (1), wherein the sound output control unit is further configured to generate the localization information based on a distance between the displayed second content screen and the non-displayed first content screen.

(8) The formation processing apparatus of (1), wherein the sound output control unit is further configured to initiate an outputting of the notification sound with a directivity that conveys to the user a relative location of the non-displayed first content screen relative to the second content screen that is currently displayed.

(9) The information processing apparatus of (1), wherein the first content screen is associated with an application that is open and active in the information processing device.

(10) The information processing apparatus of (1), wherein the first content screen is open and active in the information processing device prior to an occurrence of a triggering event to which the notification sound is responsively generated.

(11) The information processing apparatus of (1), wherein the first content screen is generated after an occurrence of a triggering event upon which basis the notification sound is generated.

(12) The information processing apparatus of (1), wherein the sound output control unit is further configured to generate updated localization information of the notification sound associated with the first content screen when a current displaying changes to a third content screen from the second content screen.

(13) The information processing apparatus of (1), wherein the display control unit is further configured to initiate a displaying of guidance information indicating an operation direction for initiating a displaying of the first content screen.

(14) The information processing apparatus of (1), farther including an operation unit configured to generate instructions for initiating the selective displaying of desired ones of the content screens.

(15) The information processing apparatus of (14), wherein the operation control unit includes a touch panel configured to receive a touch input from the user.

(16) The information processing apparatus of (14), wherein the operation unit includes a tilt sensor configured to acquire tilt information of a housing within which the display unit resides.

(17) The information processing apparatus of (16), wherein the display control unit is further configured to initiate a change in a display orientation of the content screens based on the acquired tilt information.

(18) The information processing apparatus of (17), wherein the sound output control unit is further configured to generate updated localization information of the notification sound upon initiation of the change in the display orientation of the content screens.

(19) The information processing apparatus of (1), wherein a relative location of the first content screen relative to the second content screen is restricted to selected directions emanating away from the second content screen.

(20) The information processing apparatus of (19), wherein the relative location of the first content screen relative to the second content screen is restricted to positions vertically displaced from the second content screen.

(21) The information processing apparatus of (19), wherein the relative location of the first content screen relative to the second content screen is restricted to positions horizontally displaced from the second content screen.

(22) An information processing apparatus including:
a display unit configured to selectively display content screens thereon;
a sound output control unit configured to generate localization information of a notification sound associated with a first content screen that is not currently displayed by the display unit; and
a sound output unit configured to output the notification sound to a user in accordance with the localization information while the display unit displays a second content screen thereon.

(23) An information processing method including:
generating localization information of a notification sound associated with a first content screen that is not currently displayed; and
outputting, while a second content screen is being displayed to a user, the notification sound to the user in accordance with the localization information.

(24) The information processing method of (23), wherein the notification sound is output with a directivity that conveys to the user an operation direction for enabling change of display from the second content screen to the first content screen.

(25) The information processing method of (23), wherein the notification sound is output with a directivity that conveys to the user a relative location of the non-displayed first content screen relative to the displayed second content screen.

(26) The information processing method of (23), wherein the first content screen is created after an occurrence of a triggering event upon which basis the notification sound is generated.

(27) A non-transitory computer-readable medium embodied with a program, which when executed by a computer, causes the computer to perform a method including:
generating localization information of a notification sound associated with a first content screen that is not currently displayed; and
outputting, while a second content screen is being displayed to a user, the notification sound to the user in accordance with the localization information.

(28) An information processing device including:
an operation direction acquisition unit that acquires, from a first screen, an operation direction from which a second screen associated with a notification sound is displayed; and
a localization information generation unit that generates localization information indicating a sound source position of the notification sound according to the operation direction.

(29) The information processing device according to (28), wherein the localization information generation unit generates the localization information according to the distance between the first screen and the second screen.

(30) The information processing device according to (28) or (29), wherein the localization information generation unit causes the sound source position to be changed over time and then generates the localization information having the arrival point of the sound source position as a position according to the operation direction.

(31) The information processing device according to any one of (28) to (30), further including:
a tilt information acquisition unit that acquires tilt information of a housing of the information processing device,
wherein the localization information generation unit generates the localization information in which the sound source position is changed based on the tilt information.

(32) The information processing device according to any one of (28) to (31), further including:
a generation unit that generates the second screen when generation of notification information is detected,
wherein the operation direction acquisition unit determines the operation direction from which the second screen is displayed when the second screen is generated.

(33) The information processing device according to (32), wherein the operation direction acquisition unit determines the operation direction based on a direction in which an operation for changing the display state of the first screen is accepted.

(34) The information processing device according to (33), wherein the operation direction acquisition unit sets a direction in which an operation for changing the display state of the first screen is not accepted to be the operation direction from which the second screen is displayed.

(35) The information processing device according to any one of (32) to (34), further including:
a guidance information display control unit that, when the operation direction acquisition unit determines the operation direction, causes guidance information indicating the determined operation direction to be displayed.

(36) The information processing device according to any one of (28) to (35), further including:
an acoustic processing unit that performs a stereophonic process for the notification sound based on the localization information.

(37) The information processing device according to (29), further including:
an operation information acquisition unit that acquires operation information for changing the display state of a display screen,
wherein, when the distance between the first screen and the second screen is changed based on the operation information, the localization information generation unit changes the sound source position following the change in the distance.

(38) The information processing device according to any one of (32) to (37),
wherein the second screen is an activated screen of an application having notification information, and
wherein the notification sound is a sound for informing of the notification information.

(39) The information processing device according to any one of (28) to (31),
wherein the first screen is a screen currently displayed among screens displaying arranged icons of applications, and
wherein the second screen is a screen on which the icon of an application having the notification information is displayed.

(40) An information processing method including:
acquiring, from a first screen, an operation direction from which a second screen associated with a notification sound is displayed; and generating localization information indicating a sound source position of the notification sound according to the operation direction.

(41) A program that causes a computer to function as an information processing device including:
an operation direction acquisition unit that acquires, from a first screen, an operation direction from which a second screen associated with a notification sound is displayed; and
a localization information generation unit that generates localization information indicating a sound source position of the notification sound according to the operation direction.

The invention claimed is:

1. An information processing apparatus comprising:
a display control unit configured to
initiate a selective displaying of only active content screens of a plurality of content screens as a currently displaying screen that is displayed by a display unit, based on a user operation,
wherein the active content screens are screens arranged to be selectively displayed before an outputting of a notification sound; and
a sound output control unit configured to
generate localization information of the notification sound associated with activating a currently inactive application, and
initiate, when the notification sound is associated with activating a first content screen of the plurality of content screens that is an inactive screen and corresponding to the currently inactive application, the outputting of the notification sound, in accordance with the localization information, with a directivity that conveys to a user an operation direction for accessing the first content screen to enable a changing of the currently displaying screen from a second content screen of the active content screens to the first content screen,
wherein the inactive screen is a screen not arranged to be selectively displayed before the outputting of the notification sound associated with the currently inactive application is initiated,
wherein the display control unit is further configured to, after the outputting of the notification sound is initiated, activate, based on the user operation and corresponding to the operation direction, the first content screen so that the display control unit enables the selective displaying, based on the user operation, of the first content screen as the currently displaying screen, and
wherein the display control unit and the sound output control unit are each implemented via at least one processor.

2. The information processing apparatus of claim 1, wherein the first content screen is not being displayed when the sound output control unit initiates the outputting of the notification sound.

3. The information processing apparatus of claim 1, wherein the display control unit is further configured to initiate a selective changing of the currently displaying screen from the second content screen to the first content screen, based on a scroll operation initiated by the user and corresponding to the operation direction.

4. The information processing apparatus of claim 1, wherein the localization information indicates a sound source position of the notification sound.

5. The information processing apparatus of claim 4, wherein a volume of the notification sound is higher when the sound source position of the notification sound is located closer to the second content screen that is currently being displayed.

6. The information processing apparatus of claim 1, wherein the sound output control unit is further configured to initiate an outputting of the notification sound with a directivity that conveys to the user a relative location of the first content screen that is not currently being displayed relative to the second content screen that is currently displayed.

7. The information processing apparatus of claim 1, wherein the first content screen is generated after an occurrence of a triggering event upon which basis the notification sound is generated.

8. The information processing apparatus of claim 1, wherein the sound output control unit is further configured to generate updated localization information of the notification sound associated with the first content screen when the currently displaying screen changes to a third content screen from the second content screen.

9. The information processing apparatus of claim 8, wherein the sound output control unit is further configured to generate the localization information based on a distance between the second content screen that is currently being displayed and the third content screen that is not currently being displayed.

10. The information processing apparatus of claim 9, wherein the distance indicates a number of user operations for enabling the changing of the currently displaying screen from the second content screen to the first content screen.

11. The information processing apparatus of claim 9, wherein the distance indicates a number of changes of display screens for changing the second content screen to the first content screen.

12. The information processing apparatus of claim 8, wherein the third content screen is associated with an application that is open and active in the information processing apparatus.

13. The information processing apparatus of claim 8, wherein the third content screen is open and active in the information processing apparatus prior to an occurrence of a triggering event to which the notification sound is responsively generated.

14. The information processing apparatus of claim 1, wherein the display control unit is further configured to initiate a displaying of guidance information indicating an operation direction for initiating a displaying of the first content screen.

15. The information processing apparatus of claim 1, further comprising:
an operation unit configured to generate instructions for initiating the selective displaying of desired content screens of the plurality of content screens,
wherein the operation unit is implemented via at least one processor.

16. The information processing apparatus of claim 15, wherein the operation unit comprises a touch panel configured to receive a touch input from the user.

17. The information processing apparatus of claim 15, wherein the operation unit comprises a tilt sensor configured to acquire tilt information of a housing within which a display unit resides.

18. The information processing apparatus of claim 17, wherein the display control unit is further configured to initiate a change in a display orientation of the plurality of content screens, based on the acquired tilt information.

19. The information processing apparatus of claim 18, wherein the sound output control unit is further configured to generate updated localization information of the notification sound upon initiation of the change in the display orientation of the plurality of content screens.

20. The information processing apparatus of claim 1, wherein a relative location of the first content screen relative to the second content screen is restricted to selected directions emanating away from the second content screen.

21. The information processing apparatus of claim 20, wherein the relative location of the first content screen relative to the second content screen is restricted to positions vertically displaced from the second content screen.

22. The information processing apparatus of claim 20, wherein the relative location of the first content screen relative to the second content screen is restricted to positions horizontally displaced from the second content screen.

23. The information processing apparatus of claim 1, wherein the first content screen is related to a notification associated with the currently inactive application.

24. The information processing apparatus of claim 1, wherein the sound output control unit is further configured to generate the localization information based on a number of the plurality of content screens between the second content screen that is currently being displayed and the first content screen that is not currently being displayed.

25. The information processing apparatus of claim 1, wherein the sound output control unit configured to
initiate, when the notification sound is associated with a third content screen of the active content screens, the outputting of the notification sound, in accordance with the localization information, with a directivity that conveys to the user the operation direction for accessing the third content screen and a volume that conveys a distance between the third content screen and the currently displaying screen to enable the changing of the currently displaying screen from the second content screen that is currently being displayed to the third content screen.

26. The information processing apparatus of claim 25, wherein, when the notification sound is associated with activating the first content screen, the notification sound includes only the directivity, and when the notification sound is associated with activating the third content screen, the notification sound includes the directivity and the distance.

27. An information processing apparatus comprising:
a display unit configured to
selectively display only active content screens of a plurality of content screens as a currently displaying screen that is displayed by a display unit, based on a user operation,
wherein the active content screens are screens arranged to be selectively displayed before an outputting of a notification sound;
a sound output control unit configured to generate localization information of the notification sound associated with activating a currently inactive application; and
a sound output unit configured to output, when the notification sound is associated with activating a first content screen of the plurality of content screens that is an inactive screen and corresponding to the currently inactive application, in accordance with the localization information, the notification sound with a directivity that conveys to a user an operation direction for accessing the first content screen to enable a changing of the currently displaying screen from a second content screen of the active content screens to the first content screen,
wherein the inactive screen is a screen not arranged to be selectively displayed before the outputting of the notification sound associated with the currently inactive application is initiated,
wherein the display unit is further configured to, after the outputting of the notification sound, activate, based on the user operation and corresponding to the operation direction, the first content screen so that the display unit enables the selective displaying, based on the user operation, of the first content screen as the currently displaying screen, and
wherein the display unit, the sound output control unit, and the sound output unit are each implemented via at least one processor.

28. An information processing method comprising:
enabling selective displaying of only active screens of a plurality of content screens as a currently displaying screen, based on a user operation,
wherein the active content screens are screens arranged to be selectively displayed before an outputting of a notification sound;
generating localization information of the notification sound associated with activating a currently inactive application;
outputting, when the notification sound is associated with activating a first content screen, of the plurality of content screens, that is an inactive screen and corresponding to the currently inactive application, in accordance with the localization information, the notification sound with a directivity that conveys to a user an operation direction for accessing the first content screen to enable a changing of the currently displaying screen from a second content screen of the active content screens to the first content screen,
wherein the inactive screen is a screen not arranged to be selectively displayed before the outputting of the notification sound associated with the currently inactive application is initiated; and
after the outputting of the notification sound, activating, based on the user operation and corresponding to the operation direction, the first content screen to enable the selective displaying, based on the user operation, of the first content screen as the currently displaying screen.

29. The information processing method of claim 28, wherein the notification sound is output with a directivity that conveys to the user a relative location of the first content screen that is not currently being displayed relative to the second content screen that is currently being displayed.

30. The information processing method of claim 28, wherein the first content screen is created after an occurrence of a triggering event upon which basis the notification sound is generated.

31. A non-transitory computer-readable medium embodied with a program, which when executed by a computer, causes the computer to perform a method comprising:
enabling selective displaying of only active screens of a plurality of content screens as a currently displaying screen, based on a user operation,
wherein the active content screens are screens arranged to be selectively displayed before an outputting of a notification sound;

generating localization information of the notification sound associated with activating a currently inactive application;

outputting, when the notification sound is associated with activating a first content screen, of the plurality of content screens, that is an inactive screen and corresponding to the currently inactive application, in accordance with the localization information, the notification sound with a directivity that conveys to a user an operation direction for accessing the first content screen to enable a changing of the currently displaying screen from a second content screen of the active content screens to the first content screen, wherein the inactive screen is a screen not arranged to be selectively displayed before the outputting of the notification sound associated with the currently inactive application is initiated; and after the outputting of the notification sound, activating, based on the user operation and corresponding to the operation direction, the first content screen to enable the selective displaying, based on the user operation, of the first content screen as the currently displaying screen.

* * * * *